United States Patent
Funahashi et al.

(10) Patent No.: US 7,151,836 B1
(45) Date of Patent: Dec. 19, 2006

(54) SPEAKER APPARATUS AND SOUND REPRODUCTION APPARATUS

(75) Inventors: Osamu Funahashi, Osaka (JP); Hiroyuki Morimoto, Mie (JP); Norimitsu Kurihara, Saitama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/537,863

(22) Filed: Mar. 29, 2000

(30) Foreign Application Priority Data

Mar. 31, 1999 (JP) ............................. 11-092570
Nov. 10, 1999 (JP) ............................. 11-319218

(51) Int. Cl.
*H04R 25/00* (2006.01)
*H04R 1/20* (2006.01)
*H04R 3/00* (2006.01)
*H05K 5/00* (2006.01)

(52) U.S. Cl. ................ 381/150; 381/351; 381/337; 381/96; 181/144; 181/145

(58) Field of Classification Search .............. 381/96, 381/150, 337, 351; 181/144, 145
See application file for complete search history.

(56) References Cited

U.S. PATENT DOCUMENTS

| | | | | |
|---|---|---|---|---|
| 4,905,788 A | * | 3/1990 | Lanternier | 181/144 |
| 4,924,963 A | * | 5/1990 | Polk | 181/144 |
| 5,621,804 A | * | 4/1997 | Beppu | 381/332 |
| 5,929,393 A | * | 7/1999 | Jeter, Jr. | 181/199 |
| 6,031,919 A | * | 2/2000 | Funahashi et al. | 381/150 |
| 6,259,798 B1 | * | 7/2001 | Perkins et al. | 381/397 |
| 6,686,036 B1 | * | 2/2004 | Tokura et al. | 428/323 |

FOREIGN PATENT DOCUMENTS

| | | | |
|---|---|---|---|
| DE | 39 37 090 | | 5/1990 |
| EP | 0 614 326 | | 9/1994 |
| EP | 800330 A2 | * | 10/1997 |
| GB | 2 226 214 | | 6/1990 |
| GB | 2226214 A | * | 6/1990 |
| GB | 2 260 464 | | 4/1993 |
| GB | 2260464 A | * | 4/1993 |
| JP | 01130697 A | * | 5/1989 |

OTHER PUBLICATIONS

Applicant's admitted prior art, Figure 22, p. 1, line 24-p. 2, line 16.*

* cited by examiner

*Primary Examiner*—Vivian Chin
*Assistant Examiner*—Devona E. Faulk
(74) *Attorney, Agent, or Firm*—Wenderoth, Lind & Ponack, L.L.P.

(57) ABSTRACT

A speaker apparatus includes a speaker unit, a passive radiator unit, and a front baffle on which the speaker unit and the passive radiator unit are mounted to form a portion of a speaker box and a back plate. A closed front chamber is formed by the front baffle for coupling the sound output generated from the back of the speaker unit with the passive radiator unit. A closed rear chamber is formed by the front baffle and the back plate for confining sound output generated from the front of the speaker unit. The speaker unit is disposed in a direction opposite to the direction of passive radiator unit, or in a direction approximately opposite.

17 Claims, 21 Drawing Sheets

US 7,151,836 B1

SPEAKER APPARATUS AND SOUND REPRODUCTION APPARATUS

BACKGROUND OF THE INVENTION

1. Field of the Invention

The present invention relates to a speaker apparatus and a sound reproduction apparatus; more specifically, to a speaker apparatus and a sound reproduction apparatus suitable for use in vehicles and automobiles.

2. Description of the Prior Art

Along with the increasing popularity of digital audio media, such as compact discs, mini-discs (MD), and digital video discs (DVD), the sound reproduction apparatus must be able to reproduce the wide range signals recorded in these media.

A passive radiator type Kelton system, which is a combination of a passive radiator and a speaker unit, is a conventional way for improving the sound reproduction capability of a speaker apparatus in a low frequency range (low range).

A conventional speaker apparatus of passive radiator type Kelton system is described in the following. FIG. 22 shows an exploded perspective view of the conventional speaker apparatus.

In FIG. 22, a speaker unit 1202 drives a passive radiator unit 1201. The passive radiator unit 1201 is mounted on a front baffle 1203, which is a constituent part of a speaker box. A closed front chamber 1204 couples sound output of the speaker unit 1202 with the passive radiator unit 1201. A closed rear chamber 1205 confines sound output generated from the back of the speaker unit 1202. The speaker unit 1202 is mounted on a sub baffle plate 1206, which separates a space into the closed front chamber 1204 and the closed rear chamber 1205. A back plate 1207 and the front baffle 1203 form a speaker box.

Operation of the above-configured conventional passive radiator type Kelton system speaker apparatus is described below.

As shown in FIG. 22, the sound reproducing output (hereinafter referred to as sound output) irradiated from the front of the speaker unit 1202 mounted on the sub baffle plate 1206, which has been disposed for separating the closed front chamber 1204 from the closed rear chamber 1205, drives the passive radiator unit 1201 mounted on the front baffle 1203. The sound output is conveyed by the air within the closed front chamber 1204 formed by the speaker unit 1202, the front baffle 1203 and the sub baffle plate 1206. The passive radiator unit 1201 reproduces the sound. The sound output irradiated from the back of the speaker unit 1202 is confined in the closed rear chamber 1205 formed by the speaker unit 1202, the front baffle 1203, the sub baffle plate 1206 and the back plate 1207, in order not to cause interference with the sound output of the passive radiator unit 1201.

FIG. 23 compares the low range reproduction characteristics, for demonstrating the superiority of a conventional passive radiator type Kelton system. In FIG. 23, curve 1301 represents the frequency characteristics of output sound pressure in a closed chamber speaker system. The closed chamber confines the sound output generated from the back of the speaker unit within the speaker box for the purpose of preventing interference with the sound output generated from the front of the speaker unit. However, in a case where the volume of the speaker box is not sufficiently large, the compliance to the speaker unit deteriorates and the capability of low range reproduction is reduced as seen in FIG. 23.

Curve 1302 represents the frequency characteristics of output sound pressure in a phase reversion system using the same speaker unit and the same speaker box. In the phase reversion system, sound output generated from the back of a speaker unit is put to a resonance at a certain specific frequency (non-resonating frequency) through a duct to be mixed with sound output of the speaker unit in the front. Since the sound output coming through the duct is in the same phase as that of the front sound output of the speaker unit in a frequency region above the non-resonating frequency, the radiation efficiency is increased as a result of the mutual action. Therefore, the limitation in low range reproduction is improved. In a very-low frequency range, however, the phase of the sound output coming through the duct is reversed relative to that of the sound reproducing output from the front of the speaker unit; which causes a cancellation to each other. Therefore, the sound output sharply attenuates for approximately −20 dB/oct in the very-low frequency range. So, reproduction of the heavy low sound remains insufficient.

Curve 1303 represents output sound pressure frequency characteristics in a conventional passive radiator type Kelton system using the same type speaker unit and speaker box. The passive radiator type Kelton system can extend the limitation of low range reproduction, by having each of the closed chambers formed by the passive radiator unit, the speaker unit and the speaker box at a certain specific frequency, like in the phase reversion system. Since the sound reproduction output of the passive radiator unit and that of the speaker unit are not mixed together even in the very low frequency region, the attenuation curve in the very low frequency band region remains as moderate as that of a closed chamber system, or approximately −12 dB/oct. Thus, the heavy low sound is reproduced sufficiently. Furthermore, since a diaphragm of the passive radiator does not vibrate in a frequency region above a certain specific frequency even when a speaker unit vibrates, it provides a superior band pass characteristic as a low range speaker apparatus.

As described above, the conventional passive radiator type Kelton system offers both of the advantages; viz. it is capable of reproducing heavy low sound, which is the advantage of a closed chamber system, and it can extend the limitation of low range reproduction, which is the advantage of a phase reversion system. Thus, the low range reproduction capability has been improved.

However, the conventional passive radiator type Kelton system speaker apparatus has a unique and complicated structure of separating the inside of a speaker box into a closed front chamber and a closed rear chamber using a sub baffle plate. Therefore, it is difficult for the speaker box to take a slim contour. Furthermore, since a speaker unit is totally housed within a speaker apparatus, it has a poor heat dissipation characteristic, which results in a poor withstanding capability against high inputs.

Furthermore, since a speaker unit, or the source of vibration, has been fixed on a sub baffle plate, unwanted vibration of the sub baffle plate causes abnormal sound generation. Thus, it is difficult for the conventional structure to implement a speaker box in small overall dimensions.

SUMMARY OF THE INVENTION

A speaker apparatus of the present invention comprises
a speaker unit,
a passive radiator unit formed of an edge, a damper and a diaphragm, a front baffle on which the speaker unit and the passive radiator unit are mounted, the front baffle being a constituent part of a speaker box, and a back plate; wherein a closed front chamber is provided by the front baffle for coupling sound output generated from the back of the speaker unit with the passive radiator unit, and a closed rear chamber is provided by the front baffle and the back plate for confining sound output generated from the front of the speaker unit. The speaker unit is disposed in directions opposite(reverse) to the passive radiator unit, or in a state of approximately opposite direction to the passive radiator unit.

The opposite(reverse) direction means here that a speaker unit is disposed with its front face towards the inside of a speaker box.

A speaker apparatus of the present invention includes a closed front chamber that is formed by simply mounting a speaker unit and a passive radiator unit directly on a front baffle; therefore, the sub baffle plate, which conventionally was indispensable, has been eliminated to form a simplified structure. This at the same time contributes to down-size a speaker apparatus, and to enhance the rigidity, which leads to a decreased possibility of abnormal sound generation.

Another example of speaker apparatus in accordance with the present invention is provided with an opening in the front baffle, for exposing the plate portion of the speaker unit to the outside.

In the structure, where the plate portion of the speaker unit is exposed to the outside, a speaker apparatus can be implemented in a flat contour, and an improved heat dissipation property contributes to improve the withstanding capability against high level input signals.

DETAILED DESCRIPTION OF THE INVENTION

Exemplary embodiments of the present invention are described in the following with reference to the drawings.

First Embodiment

Figure 1:
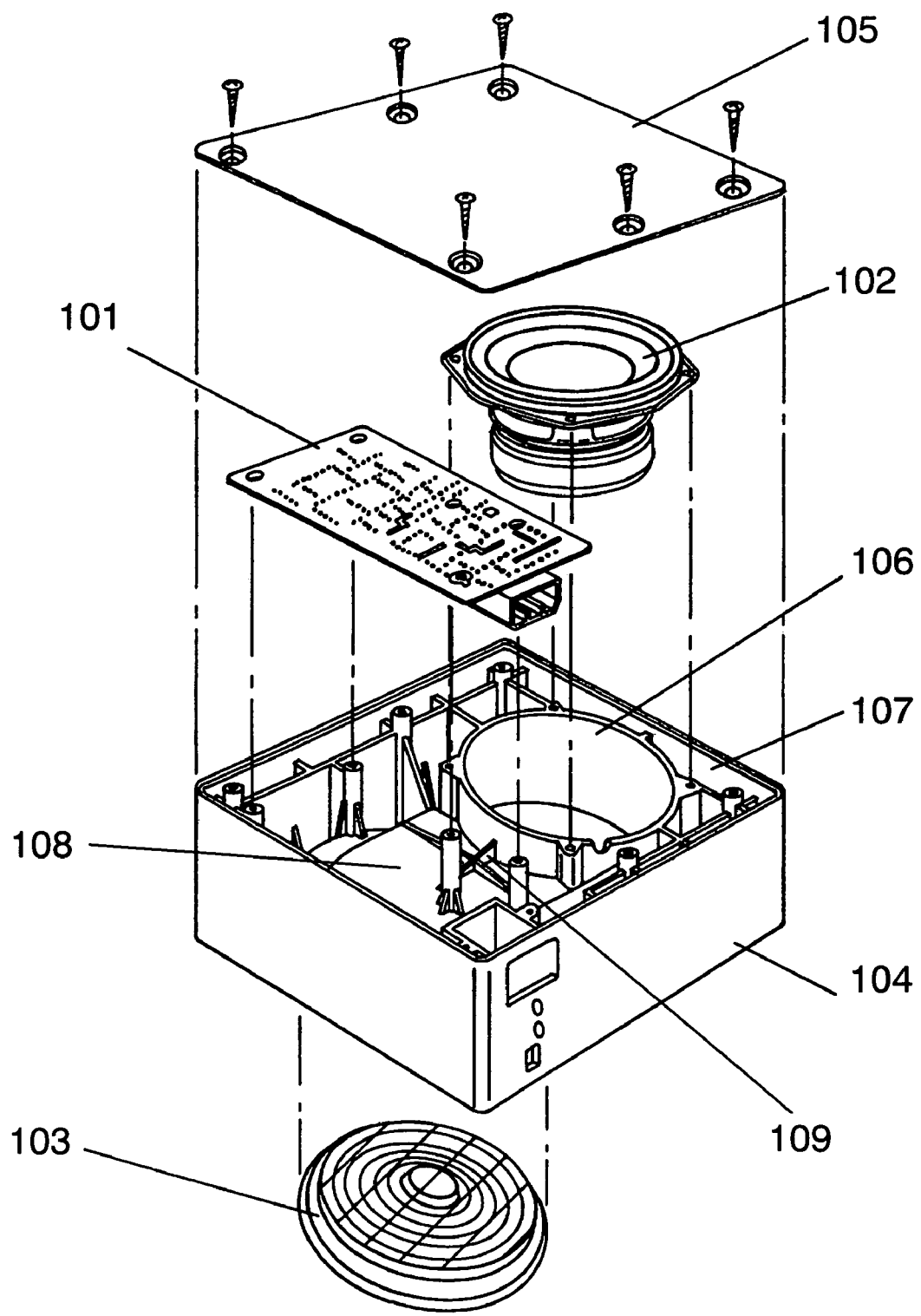
FIG. 1 shows an exploded perspective view of a sound reproduction apparatus in a first exemplary embodiment of the present invention.

FIG. 1 is an exploded perspective view showing a first example of a speaker apparatus in a first exemplary embodiment of the present invention. In FIG. 1, a speaker unit 102 is connected with a sound output signal delivered from a power amplifier 101. A passive radiator diaphragm 103 is provided with an edge and a damper to form a passive radiator unit. The speaker unit 102 and the passive radiator diaphragm 103 are mounted on a front baffle 104, which forms a constituent part of a speaker box. As shown in FIG. 1, the front baffle 104 is provided with a recessed backside portion 108 where the passive radiator diaphragm 103 is housed. A reinforcement rib 109 is provided on the backside portion 108 of the front baffle 104. A back plate 105 and the front baffle 104 constitute the speaker box. A closed front chamber 106, which is formed by the speaker unit 102, the passive radiator diaphragm 103 and the front baffle 104, couples sound output generated from the back of the speaker unit 102 with the passive radiator diaphragm 103. A closed rear chamber 107, which is formed by the speaker unit 102, the front baffle 104 and the back plate 105, confines sound output generated from the front of the speaker unit 102. The speaker unit 102 is disposed in a reverse direction, or in an approximately reverse direction, relative to the passive radiator unit. The speaker apparatus is thus formed.

Figure 2:
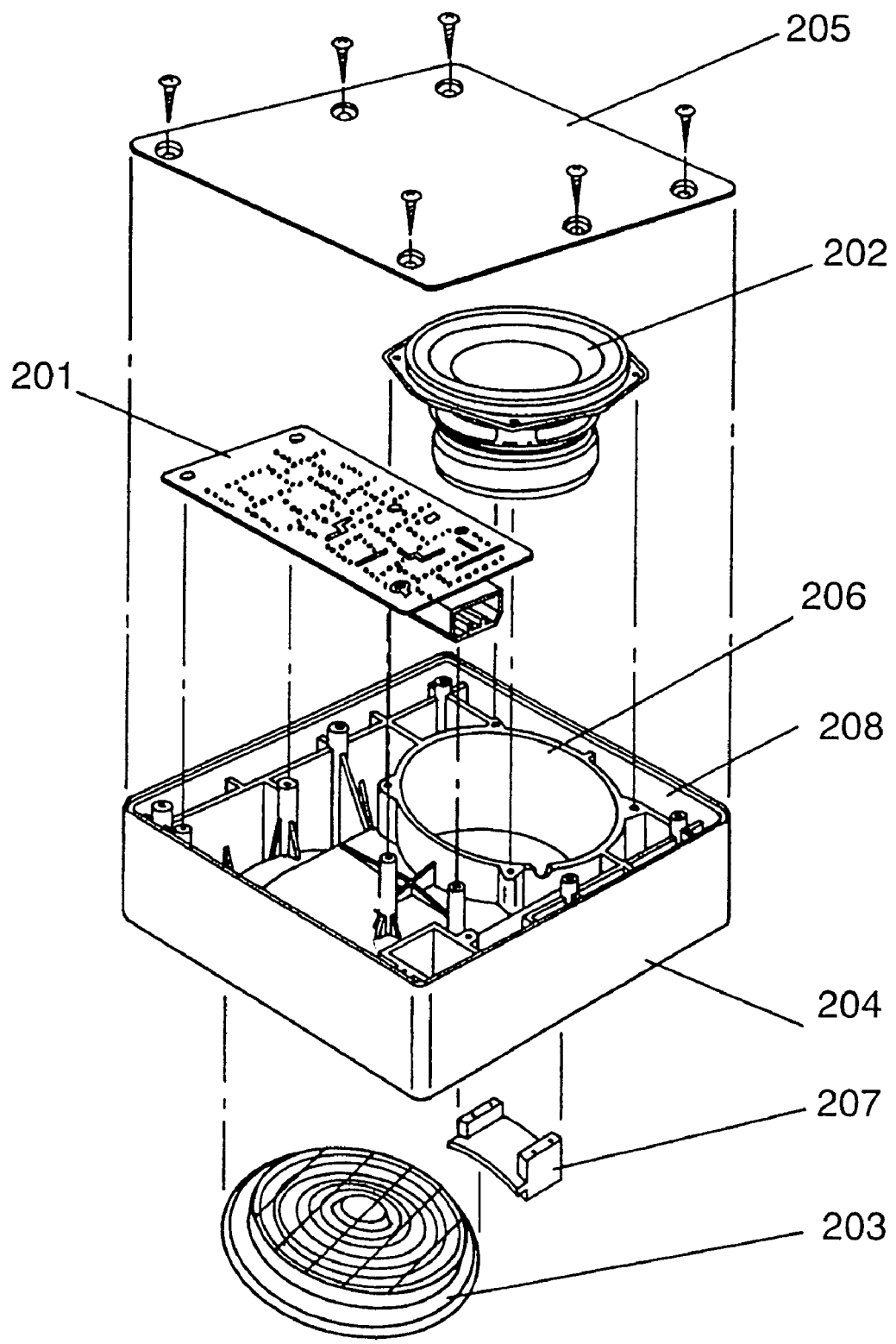
FIG. 2 shows an exploded perspective view showing another example of a sound reproduction apparatus in a first exemplary embodiment of the present invention.

FIG. 2 is an exploded perspective view of a second example of the speaker apparatus in the first exemplary embodiment. A difference with the first example is that the second example is provided with an auxiliary baffle 207, which is attached to a front face of front baffle 204 for forming, in collaboration with speaker unit 202, passive radiator diaphragm 203 and front baffle 204, a closed front chamber 206.

Figure 3:
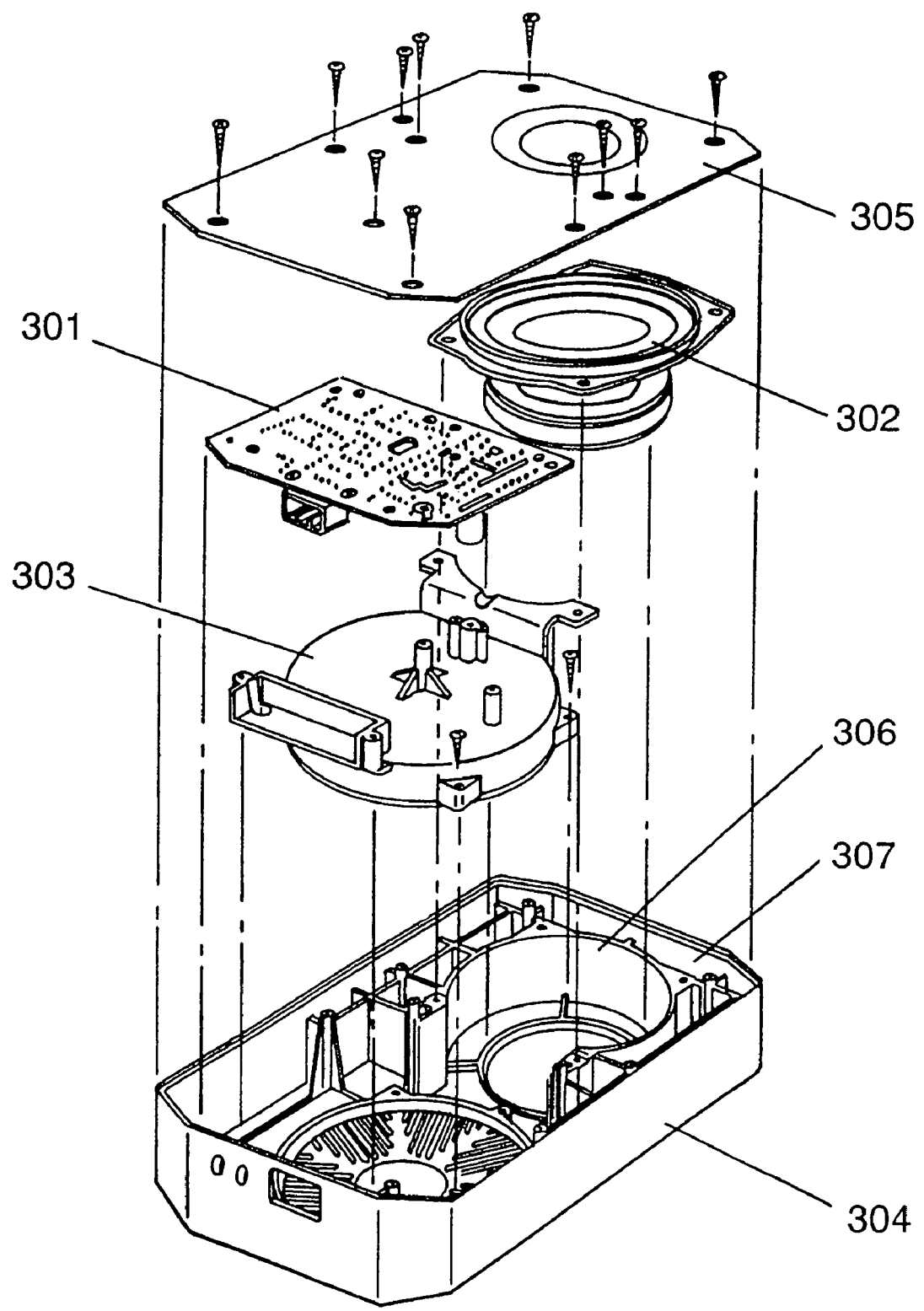
FIG. 3 shows an exploded perspective view showing still other example of a sound reproduction apparatus in a first exemplary embodiment of the present invention.

FIG. 3 is an exploded perspective view of a third example of the speaker apparatus in the first exemplary embodiment. A difference with the first example is that in the third example a passive radiator unit 303 is mounted on a closed-back frame that has an opening only in one direction.

Figure 4A:
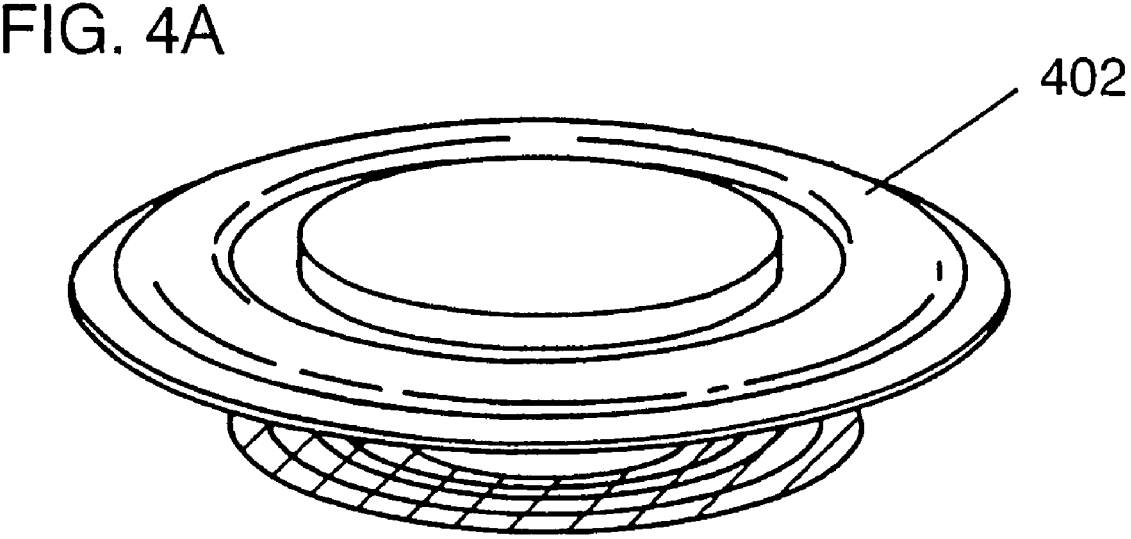
FIG. 4A shows a perspective view showing another example of a passive radiator unit in a sound reproduction apparatus of the first exemplary embodiment.
Figure 4B:
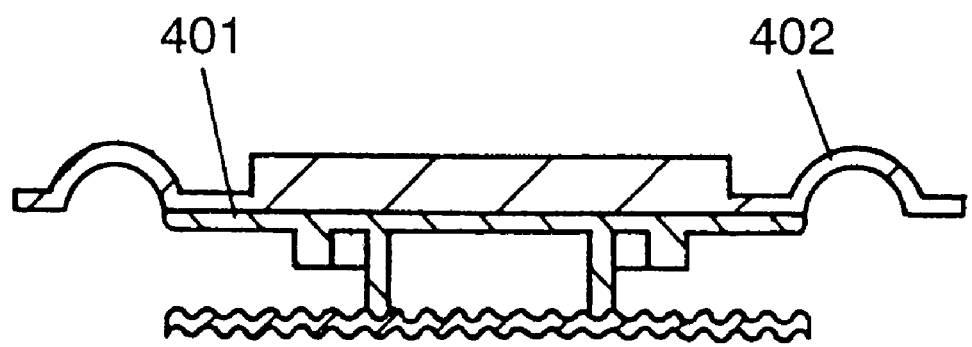
FIG. 4B shows a cross sectional view of a passive radiator unit in a sound reproduction apparatus of the first exemplary embodiment.

FIGS. 4A and 4B show a perspective view and a cross sectional view of an example of the passive radiator diaphragm 103 mounted with an edge and a damper, in the first example of the speaker apparatus of the first exemplary embodiment. In FIG. 4B, a passive radiator unit comprises a diaphragm 401 and an edge 402. The edge 402 consists of a central portion that covers a surface of the diaphragm 401 and a circumferential portion for supporting the diaphragm 401 the front baffle or a unique-shaped frame. A thick portion corresponding to a central portion of the diaphragm 401, and the circumferential portion, are shaped integrally as a single-body component. The edge 402 is shaped as an up-roll form relative to the passive radiator diaphragm.

Figure 5:
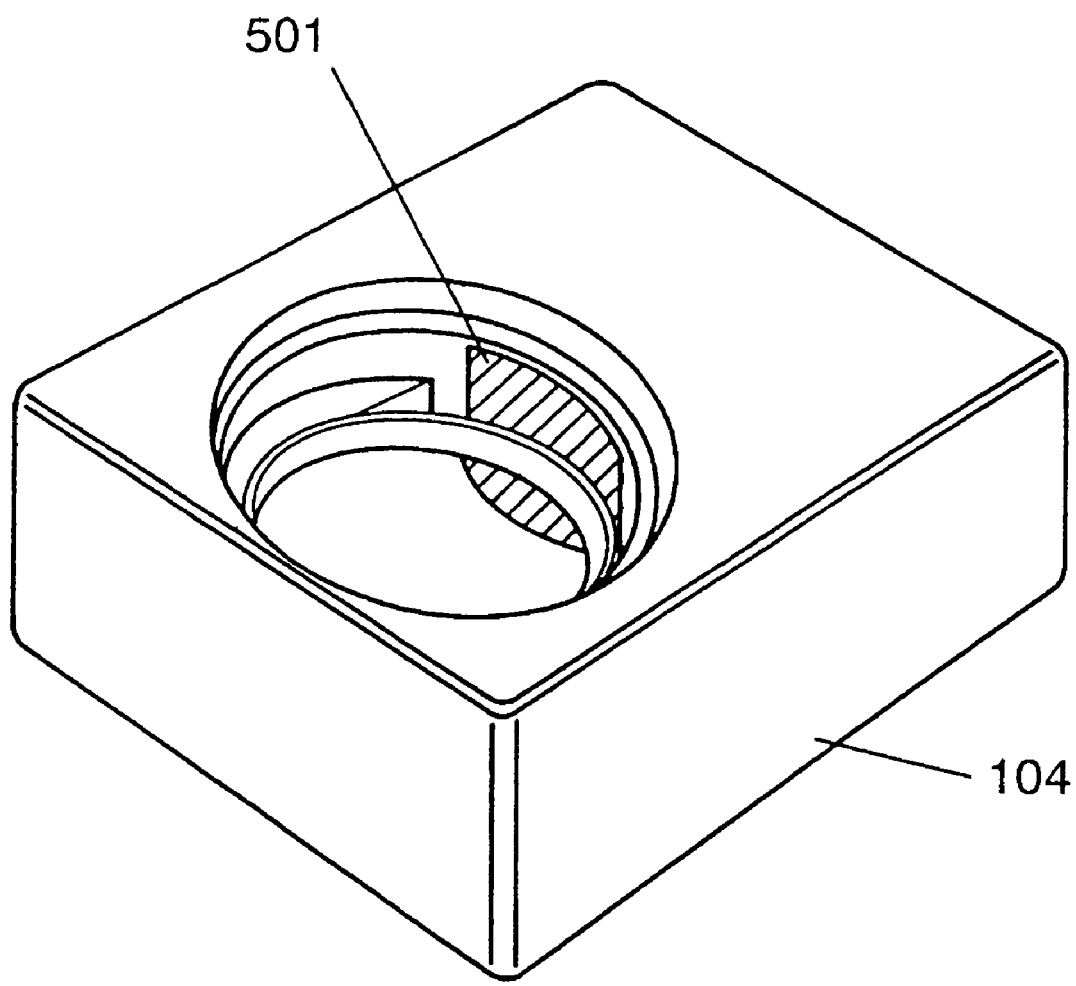
FIG. 5 shows a perspective view of a front baffle in a sound reproduction apparatus of the first exemplary embodiment.

FIG. 5 is a perspective view showing the front baffle 104 of the first example. In FIG. 5, an opening 501 connects a space between the speaker unit 102 and the passive radiator diaphragm 103 in the closed front chamber 106. An open area of the opening 501 is provided to be not less than 30% of an effective area of the diaphragm of the speaker unit 102.

Figure 6:
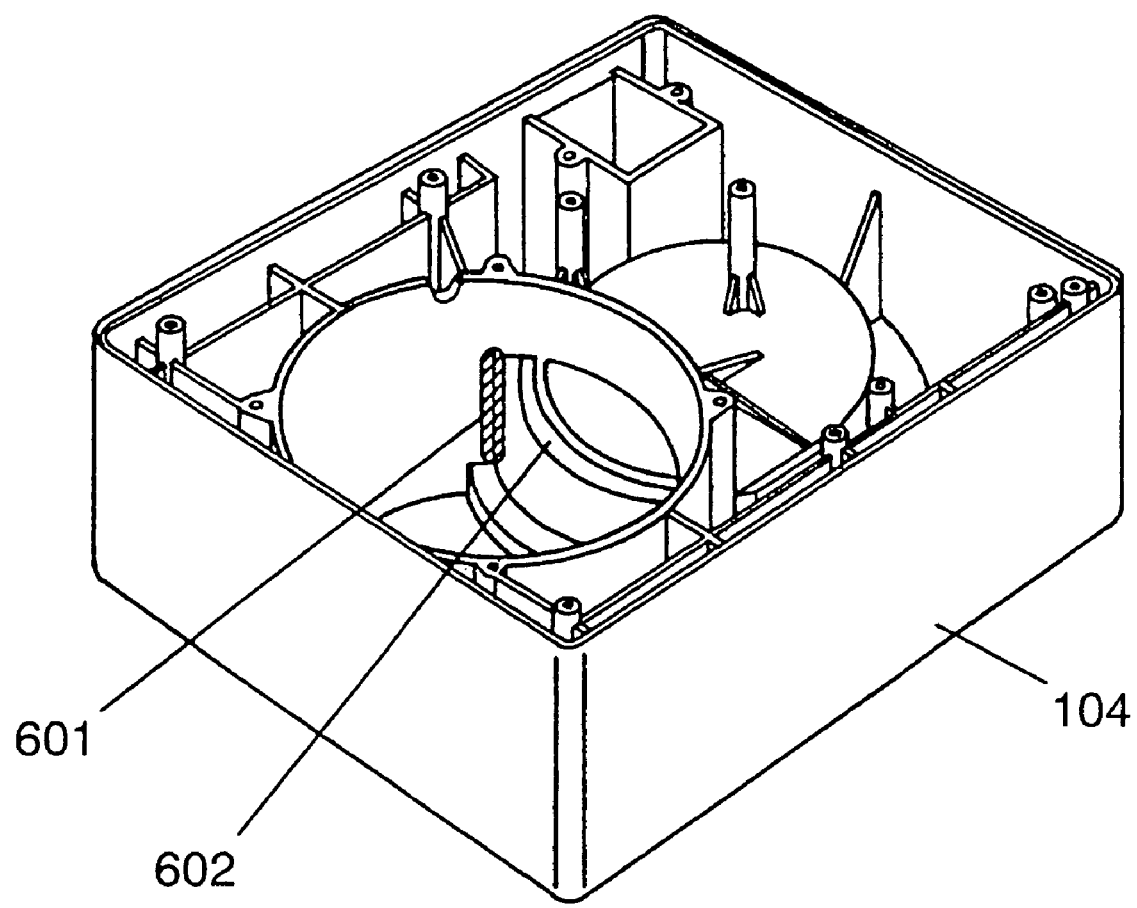
FIG. 6 shows a perspective view as seen from the inside of a front baffle in a sound reproduction apparatus of the first exemplary embodiment.

FIG. 6 is a perspective view seen from inside of the front baffle 104 of the first example. In FIG. 6, an edge portion of the opening 501, which connects the space between the speaker unit 102 and the passive radiator diaphragm 103 in the closed front chamber, has been chamfered, or round-cornered, to provide a non-angled surface 601. A semi-circle or arc-shape holder 602 is provided integrally at the vicinity of the opening 501 for supporting a damper of the passive radiator unit.

Figure 7:
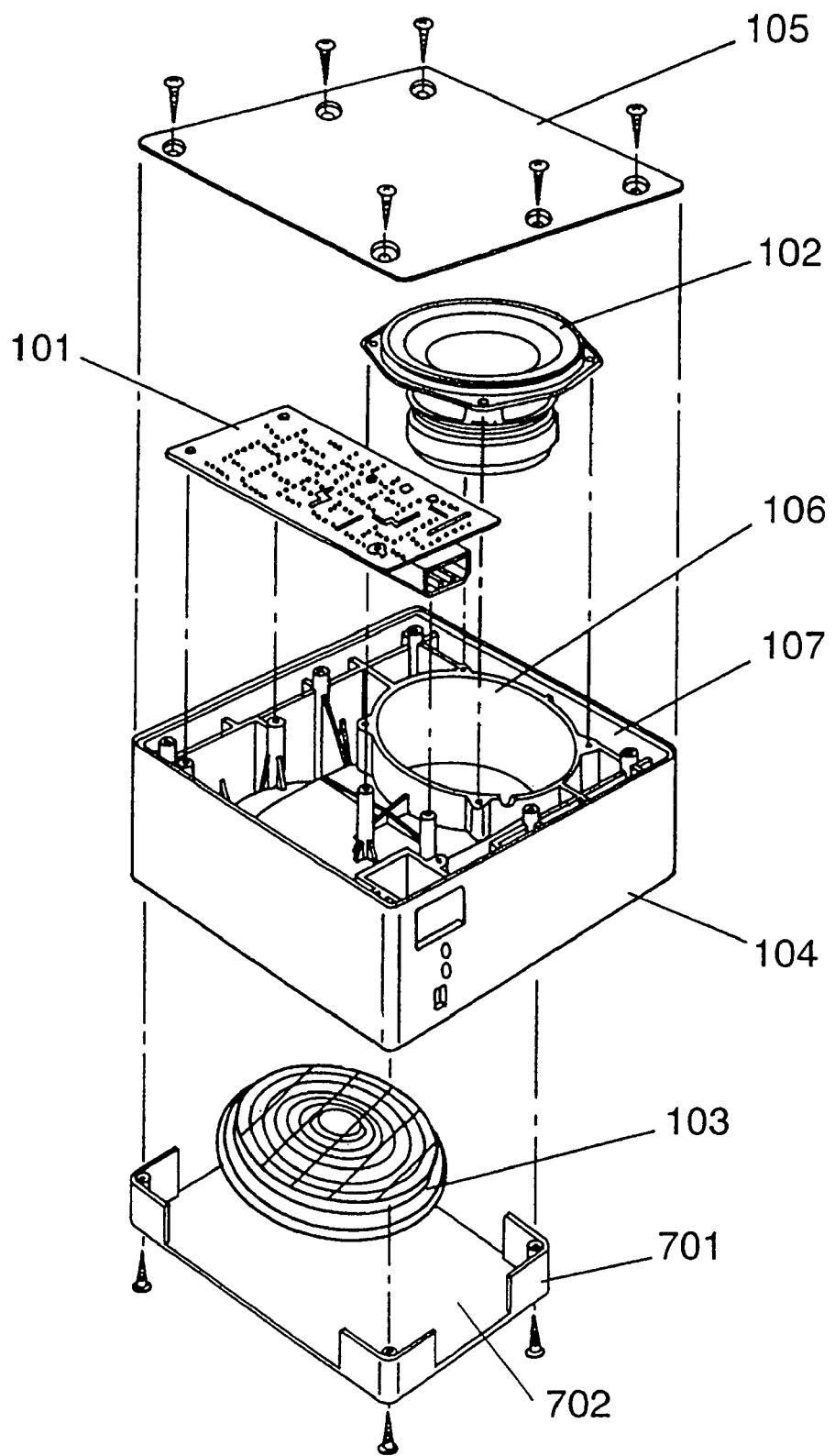
FIG. 7 shows an exploded perspective view showing another example of a sound reproduction apparatus in the first exemplary embodiment of the present invention.

FIG. 7 is an exploded perspective view showing a speaker apparatus of a fourth example. A difference with the first example is that in the fourth example a diffuser 701 is provided attached to front baffle 104. The diffuser 701 is disposed approximately 5–20 mm from a front surface of the passive radiator diaphragm 103, and is provided with a sound opening 702 in a direction that is perpendicular to a direction of sound radiation from the passive radiator. The diffuser shifts the direction of sound output generated from the passive radiator to a direction that is perpendicular to the direction of sound radiated from the passive radiator.

Figure 8:
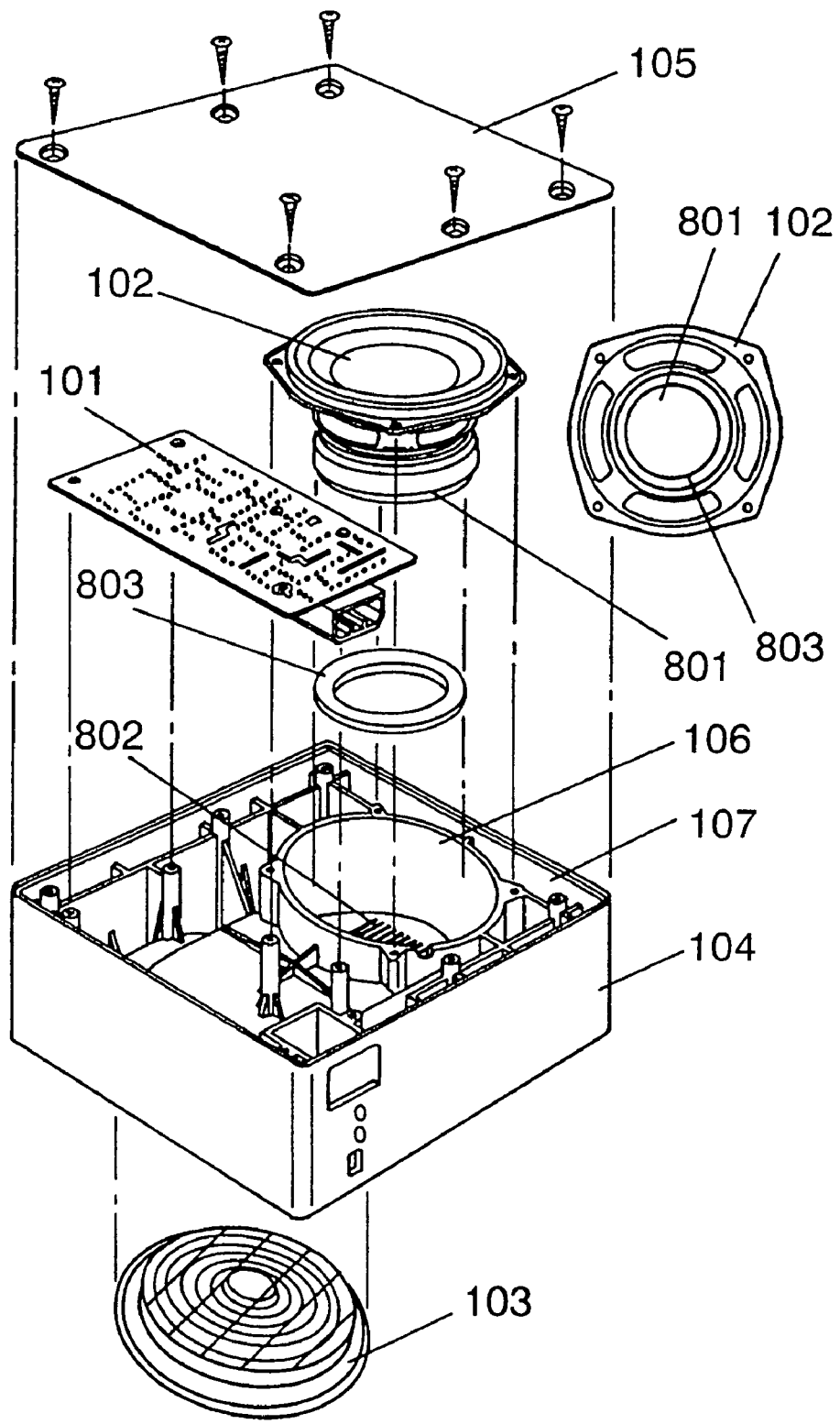
FIG. 8 shows an exploded perspective view showing still other example of a sound reproduction apparatus in the first exemplary embodiment.

FIG. 8 is an exploded perspective view showing a speaker apparatus of a fifth example. In FIG. 8, front baffle 104 is provided with heat dissipation slits 802 at a region making contact with bottom plate 801 of speaker unit 102 for allowing the speaker unit 102 to cause heat radiation. A sealing material 803 is provided in order to prevent air within closed front chamber 106 from leaking out.

Figure 9:
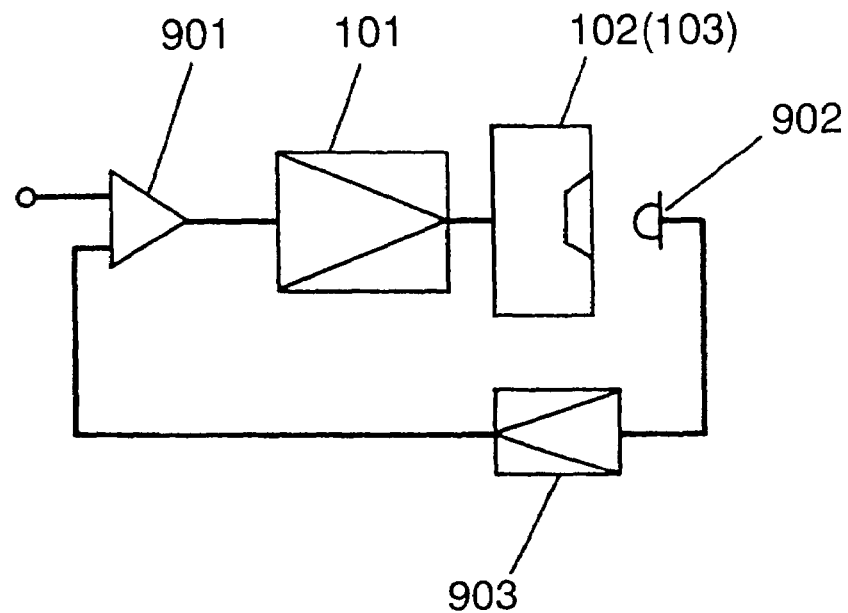
FIG. 9 shows a block diagram showing a sound reproduction apparatus in the first exemplary embodiment of the present invention, further provided with a sound feedback control that uses a microphone.

FIG. 9 is block diagram of a sound reproduction apparatus comprising a speaker apparatus of the present embodiment, and a sound feedback control system that uses a microphone. In FIG. 9, sound output generated from speaker unit 102, or passive radiator diaphragm 103, is detected by a microphone 902, and electric signals delivered from the microphone are amplified by a microphone amplifier 903. Output signal from the microphone amplifier 903 is led to a differential amplifier 901 to undergo a subtraction processing for sound feedback control. Thus, sound feedback control is performed to make a correction in accordance with ambient noise; which provides a premium advantage to the apparatus as a low range sound reproduction apparatus. The present apparatus can suppress an increase in quality factors caused as a result of down-sizing of a speaker apparatus. At the same time, transient characteristics of a speaker apparatus may be improved. The present sound reproduction apparatus uses a speaker apparatus referred to in FIG. 1 through FIG. 9.

Figure 10:
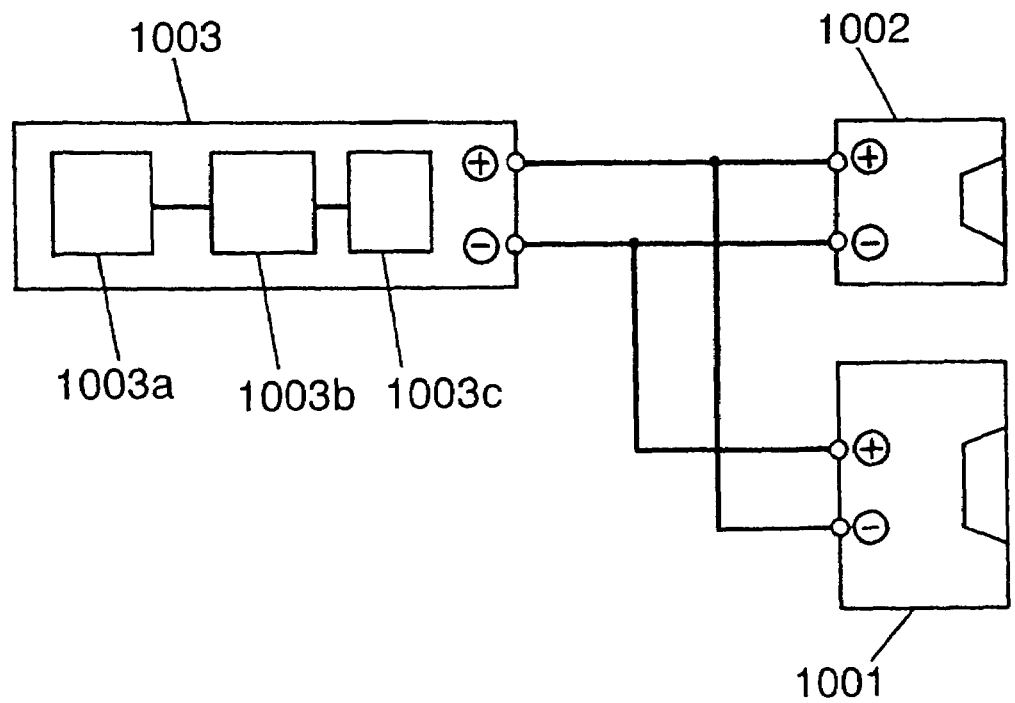
FIG. 10 shows a system diagram of a sound reproduction apparatus in the first exemplary embodiment of the present invention, in a state where it is used exclusively for low range sound reproduction.

FIG. 10 is a system diagram showing an exemplary case where a speaker apparatus of the present embodiment is used for a sound reproduction apparatus exclusively for low range reproduction. In FIG. 10, a speaker apparatus of the present embodiment is used for low range sound reproduction apparatus 1001. A sound source apparatus 1003 comprises a compact disc player, a cassette tape player, a tuner or the like sound source devices 1003$a$, a voltage amplifier 1003$b$ and a power amplifier 1003$c$. Sound signal input to the speaker apparatus 1001 is reverse-phased relative to sound signal input to a full-range speaker apparatus 1002, which reproduces mainly middle and high range sounds. With the above combination, a phase interrelationship can be optimized between the full-range speaker apparatus 1002 and the low range sound reproduction apparatus 1001.

Figure 11A:
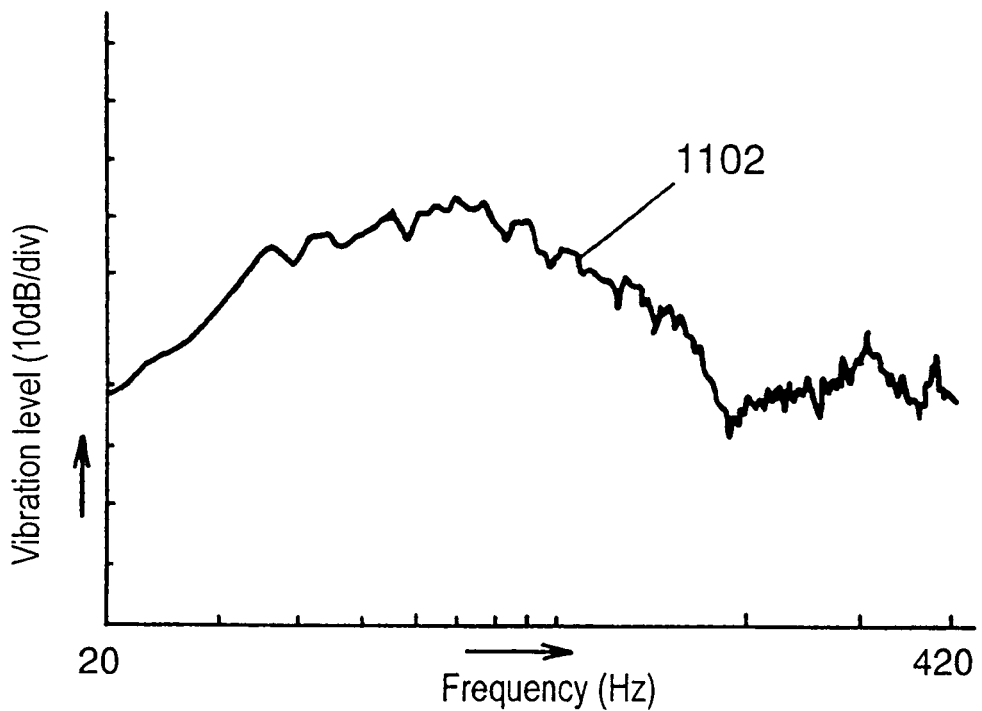
FIG. 11A shows a characteristics chart showing the level of unwanted vibration in the sound reproduction apparatus of the first exemplary embodiment.
Figure 11B:
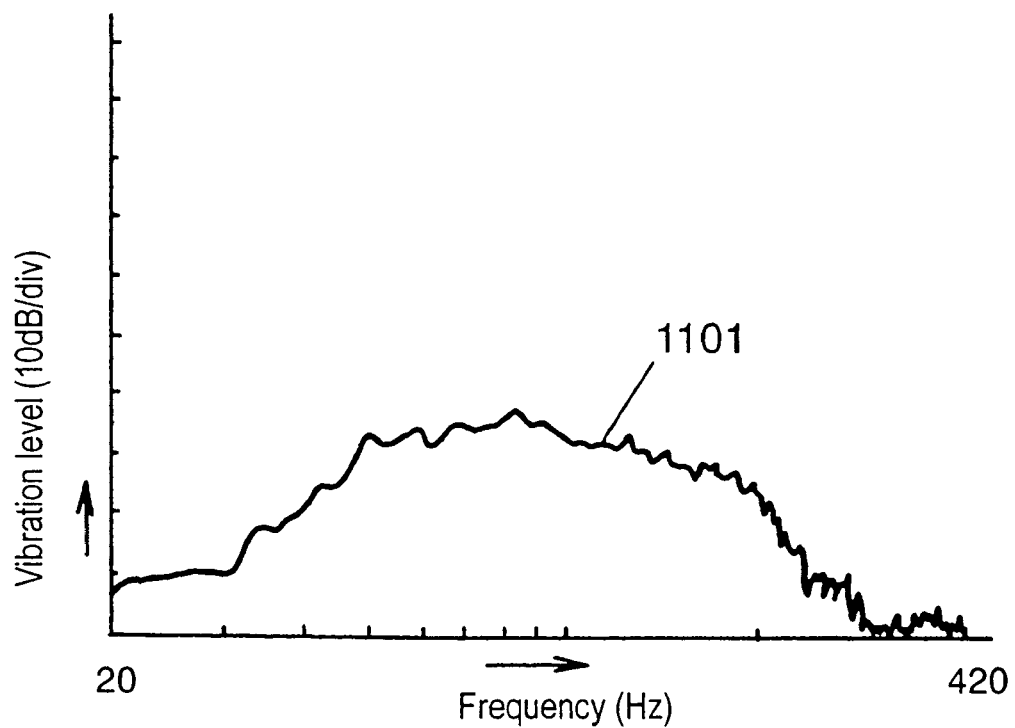
FIG. 11B shows a characteristics chart showing the level of unwanted vibration in a conventional passive radiator type Kelton system speaker apparatus.

FIG. 11 compares a level of unwanted vibration between a speaker apparatus of the present embodiment and a conventional passive radiator type Kelton system speaker apparatus. It is seen that a level of unwanted vibration 1101 at front baffle 104 of the speaker apparatus of the present embodiment is lower than a level of unwanted vibration 1102 at front baffle 1203 of the conventional passive radiator type Kelton system speaker apparatus.

Operation of the above-configured speaker apparatus is described below.

In the speaker apparatus shown in FIG. 1, sound signals amplified at the power amplifier 101 are delivered to the speaker unit 102 to be converted into sound output. Sound output generated from the back of the speaker unit 102 is conveyed to the passive radiator diaphragm 103 via the air enclosed in the closed front chamber 106 which has been formed by the speaker unit 102, the passive radiator diaphragm 103 and the front baffle 104. The passive radiator diaphragm 103 generates actual sound output. The sub baffle plate, which is an indispensable item in the conventional speaker apparatus, has been eliminated in the present embodiment and the structures have been simplified. The simplified total structure contributes to reduce the overall dimensions of a speaker apparatus.

Furthermore, as shown in FIG. 11, the conventional passive radiator type Kelton system sound reproduction apparatus has a greater unwanted vibration at the front baffle 1203, which comes from unwanted vibration of sub baffle plate 1206. Whereas, a speaker apparatus of the present embodiment, in which the sub baffle plate has been eliminated, has a high rigidity and the level of unwanted vibration at the front baffle 104 is significantly low. Therefore, the chance of abnormal sound generation is substantially reduced.

Furthermore, in a speaker apparatus of the present embodiment, sound output generated from the front of the speaker unit 102 is confined in the closed rear chamber 107 formed by the speaker unit 102, the front baffle 104 and the back plate 105 in order that the sound output from the front of the speaker unit 102 does not cause interference with the sound output of the passive radiator diaphragm 103.

Referring to FIG. 2, sound signals amplified at the power amplifier 201 are delivered to a speaker unit 202 to be converted into sound output. Sound output generated from the back of the speaker unit 202 is conveyed to a passive radiator diaphragm 203 via the air enclosed in a closed front chamber 206 which has been formed by the speaker unit 202, the passive radiator diaphragm 203, an auxiliary baffle 207 and a front baffle 204. The passive radiator diaphragm 203 generates actual sound. Thus, the sub baffle plate, which is an indispensable item in the conventional speaker apparatus, has been eliminated and the structures have been simplified. Effectiveness of the present invention remains the same as that shown in FIG. 1.

The sound output generated from the front of the speaker unit 202 is confined in a closed rear chamber 208 formed by the speaker unit 202, the front baffle 204 and a back plate 205 in order that the sound output generated from the front of the speaker unit 202 does not cause interference with the sound output of the passive radiator diaphragm 203.

Referring to FIG. 3, sound signals amplified at a power amplifier 301 are delivered to a speaker unit 302 to be converted into sound output. Sound output generated from the back of the speaker unit 302 is conveyed to the passive radiator diaphragm 303 via the air enclosed in a closed front chamber 306 which has been formed by the speaker unit 302, the passive radiator diaphragm 303 and a front baffle 304. The passive radiator diaphragm 303 generates actual sound. Effectiveness of the present invention remains the same as that shown in FIG. 1.

Sound output generated from the front of the speaker unit 302 is confined in a closed rear chamber 307 formed by the speaker unit 302, the passive radiator diaphragm 303, the front baffle 304 and the back plate 205 in order that the sound output from the front of the speaker unit 302 does not cause interference with the sound output of the passive radiator diaphragm 303.

The configuration as shown in FIG. 4 reduces generation of unwanted middle/high sounds due to resonance of a passive radiator diaphragm 401, or other factors. Use of an up-roll type edge 402 contributes to reduce the chance of abnormal sound generation, which is caused by the edge 402 blown by the high speed transfer of the air within the closed front chamber 106.

Referring to FIG. 5, the area of opening 501 connecting the space between the speaker unit 102 and the passive radiator diaphragm 103 in the closed front chamber 106 is made to be not less than 30% of an effective area of the diaphragm of the speaker unit 102. By so doing, the wind-shearing noise at the opening 501 can be reduced, and the abnormal sound generation in a speaker apparatus may be avoided.

The configuration as shown in FIG. 6 is effective to reduce the possibility of abnormal sound generation that can occur when a pulse-like transient sound signal is delivered. The abnormal sound is generated as a result of instantaneous movement of the air in the closed front chamber 106, from the speaker unit 102 side to the passive radiator diaphragm 103 side. The abnormal sound can be reduced by chamfering the edge or rounding the angled corners of the opening. A semi-circle or arc-shape holder 602 for supporting the damper of passive radiator unit may be provided integrally at the vicinity of the opening 501; this contributes to secure a sufficiently large area for the opening 501.

Referring to FIG. 7, a diffuser 701 is disposed at approximately 5–20 mm from the front surface of the passive radiator diaphragm 103. The diffuser is provided with a sound opening in a direction perpendicular to the direction of the sound radiated from diaphragm 103. The diffuser shifts direction of the sound output generated from the diaphragm 103. So, when the speaker apparatus is installed under an automobile seat, for example, it reproduces a superior quality sound without affecting the seat by unpleasant vibration.

The configuration as shown in FIG. 8 improves heat radiation of a speaker unit 102 without sacrificing superior acoustic characteristics, even when it is mounted in a small speaker apparatus, in which the heat dissipating environments are adverse for a speaker unit. This contributes to improve the withstanding property of a speaker apparatus against high inputs.

The system structure as shown in FIG. 9 provides a speaker unit with a servo effect. This improves the transient characteristics of a speaker apparatus, which has remained as an item that needs improvement with the passive radiator type Kelton system, among other systems. At the same time, increase in the quality factors, which is often accompanied as a result of down sizing of a speaker apparatus, can be curtailed.

Second Embodiment

Figure 12:
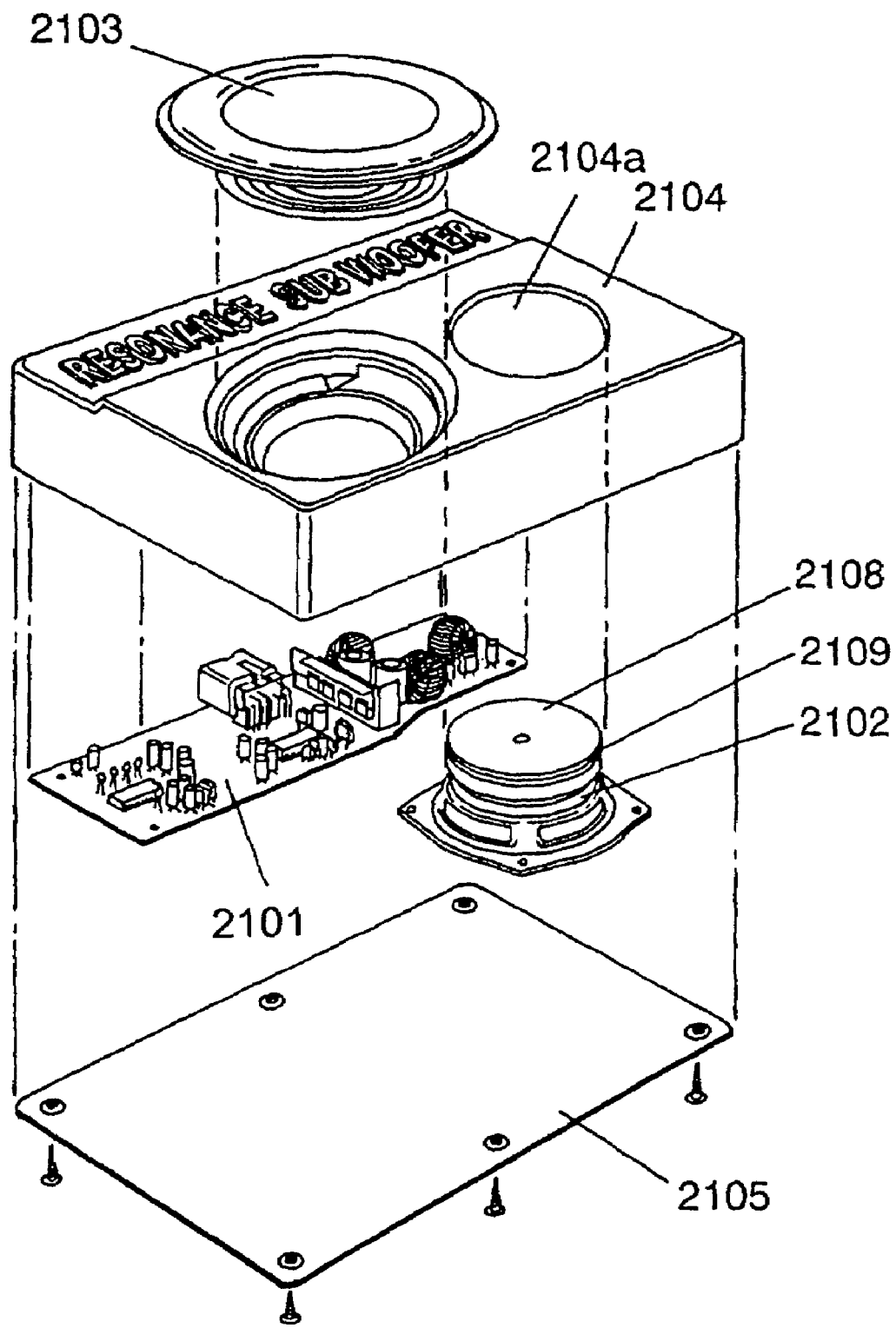
FIG. 12 shows an exploded perspective view of a speaker apparatus in a second exemplary embodiment of the present invention.
Figure 13:
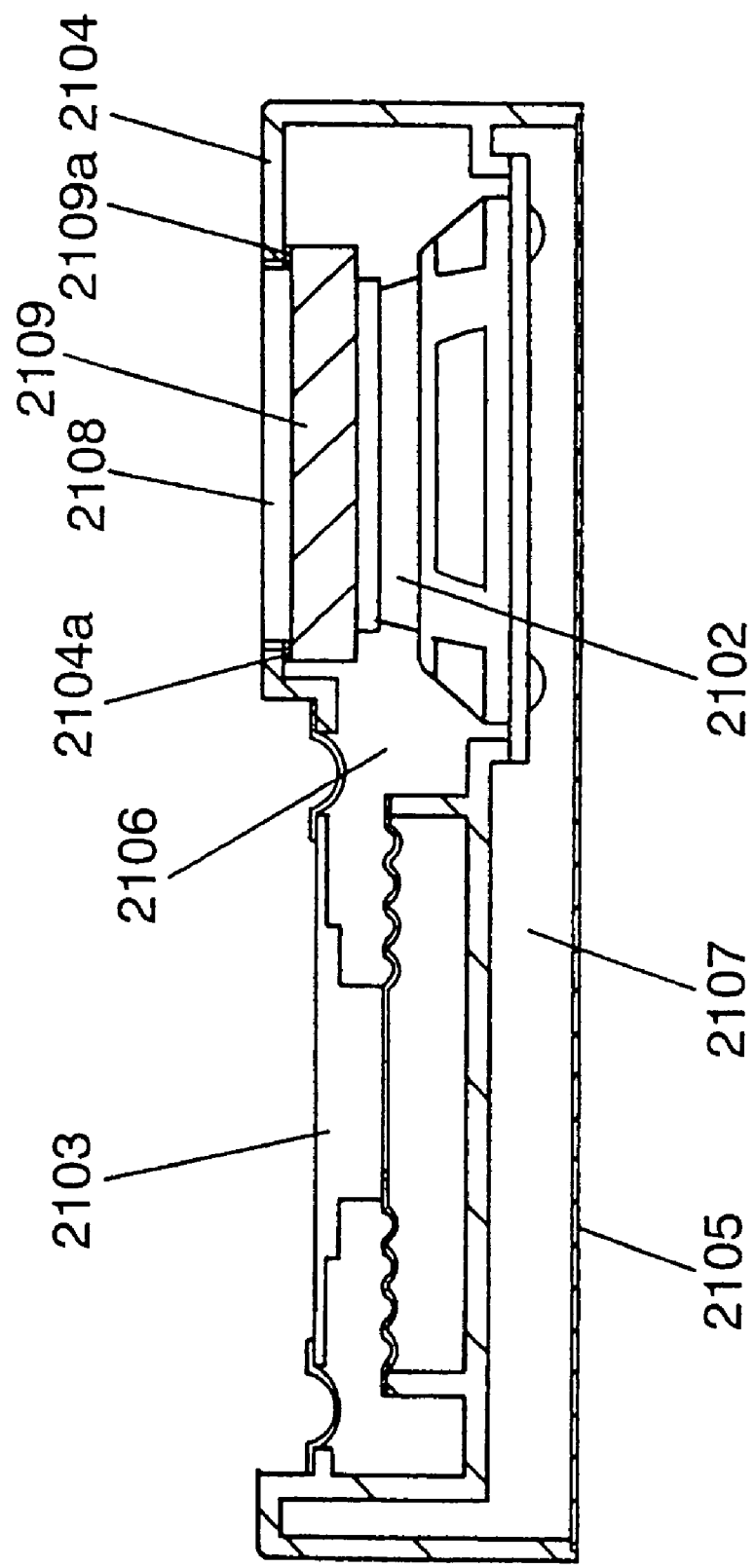
FIG. 13 shows a cross sectional view showing a speaker apparatus in the second exemplary embodiment.

FIG. 12 and FIG. 13 are an exploded perspective view and a cross sectional view, respectively, showing a first example of speaker apparatus in a second exemplary embodiment of the present invention. In FIG. 12 and FIG. 13, sound output signal of a power amplifier 2101 is delivered to a speaker unit 2102. The speaker unit 2102 and a passive radiator unit 2103 are mounted on a front baffle 2104, which forms a constituent part of a speaker box. The front baffle 2104 is provided with an opening 2104a for exposing a plate portion 2108 of the speaker unit 2102. A back plate 2105 and the front baffle 2104 constitute the speaker box.

A closed front chamber 2106, which is formed by the speaker unit 2102, the passive radiator unit 2103, the front baffle 2104 and a cushion 2109a attached to a magnet portion 2109 of the speaker unit 2102, couples sound output generated from the back of the speaker unit 2102 with the passive radiator unit 2103. A closed rear chamber 2107, which is formed by the speaker unit 2102, the front baffle 2104 and the back plate 2105, confines sound output generated from the front of the speaker unit 2102. Also in the second exemplary embodiment, the speaker unit 2102 is disposed in a reverse direction relative to the passive radiator unit 2103 to constitute a passive radiator type Kelton system speaker apparatus.

Operation of the above-configured speaker apparatus of the second exemplary embodiment is described below.

In the speaker apparatus as shown in FIG. 12 and FIG. 13, sound signals from a sound source are amplified at the power amplifier 2101. The sound signals amplified at the power amplifier 2101 are delivered to the speaker unit 2102 to be converted into sound output. Sound output generated from the back of the speaker unit 2102 is conveyed to the passive radiator unit 2103 via the air enclosed in the closed front chamber 2106. The passive radiator unit 2103 generates actual sound. Thus, a sub baffle plate, which is an indispensable item in the conventional speaker apparatus, has been eliminated to a simplified structure. Furthermore, in the second exemplary embodiment, the plate portion 2108 of the speaker unit 2102 is exposed to the outside aiming to make a contour of a speaker apparatus slim and to improve the heat dissipating characteristic. In the structure of the present embodiment, the withstanding capability against high inputs can be enhanced.

Figure 21:
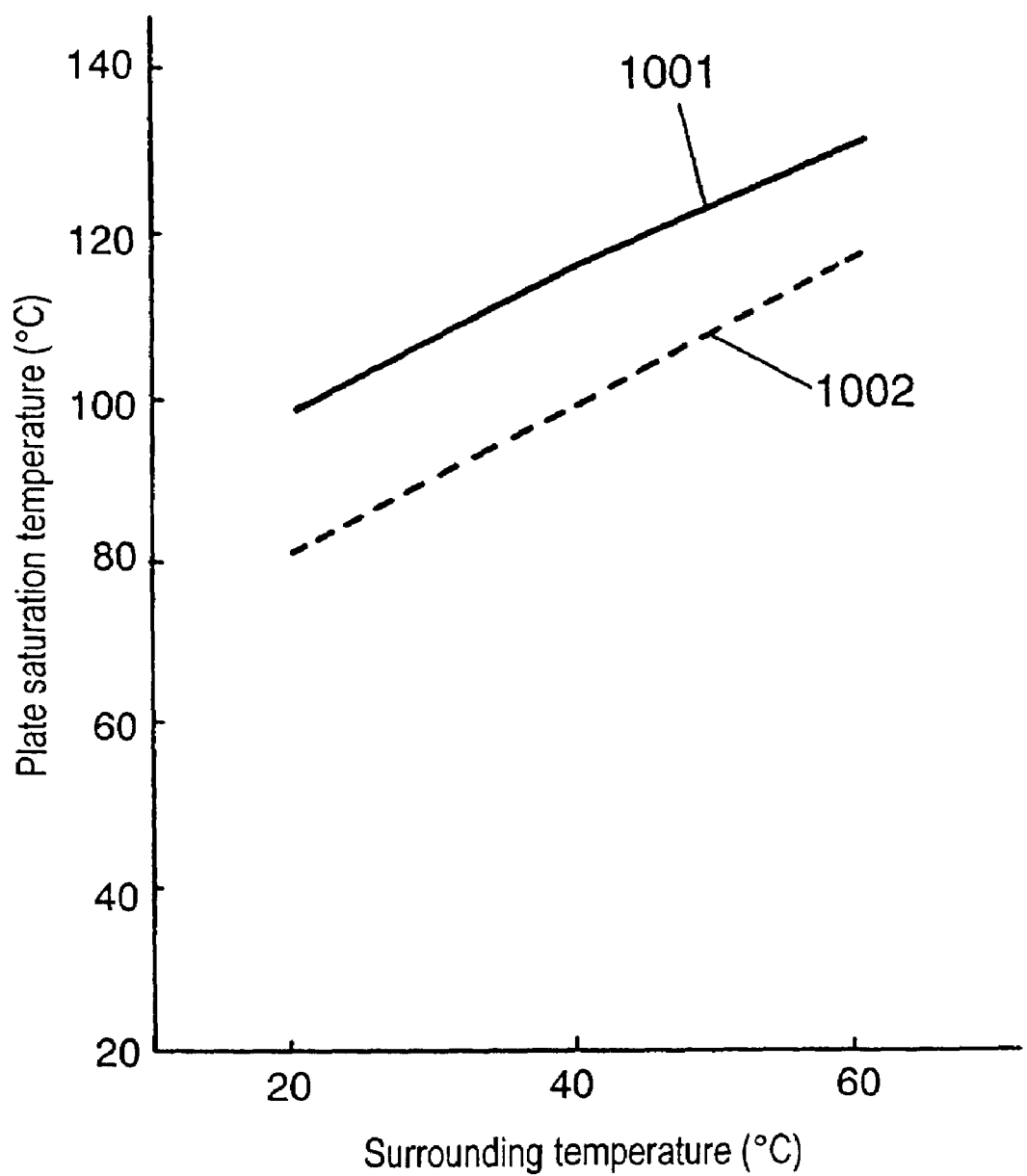
FIG. 21 shows a comparative chart showing the saturation temperature in the plate portion of the speaker unit, between a speaker apparatus in the second exemplary embodiment of the present invention and a conventional passive radiator type Kelton system speaker apparatus.
Figure 22:
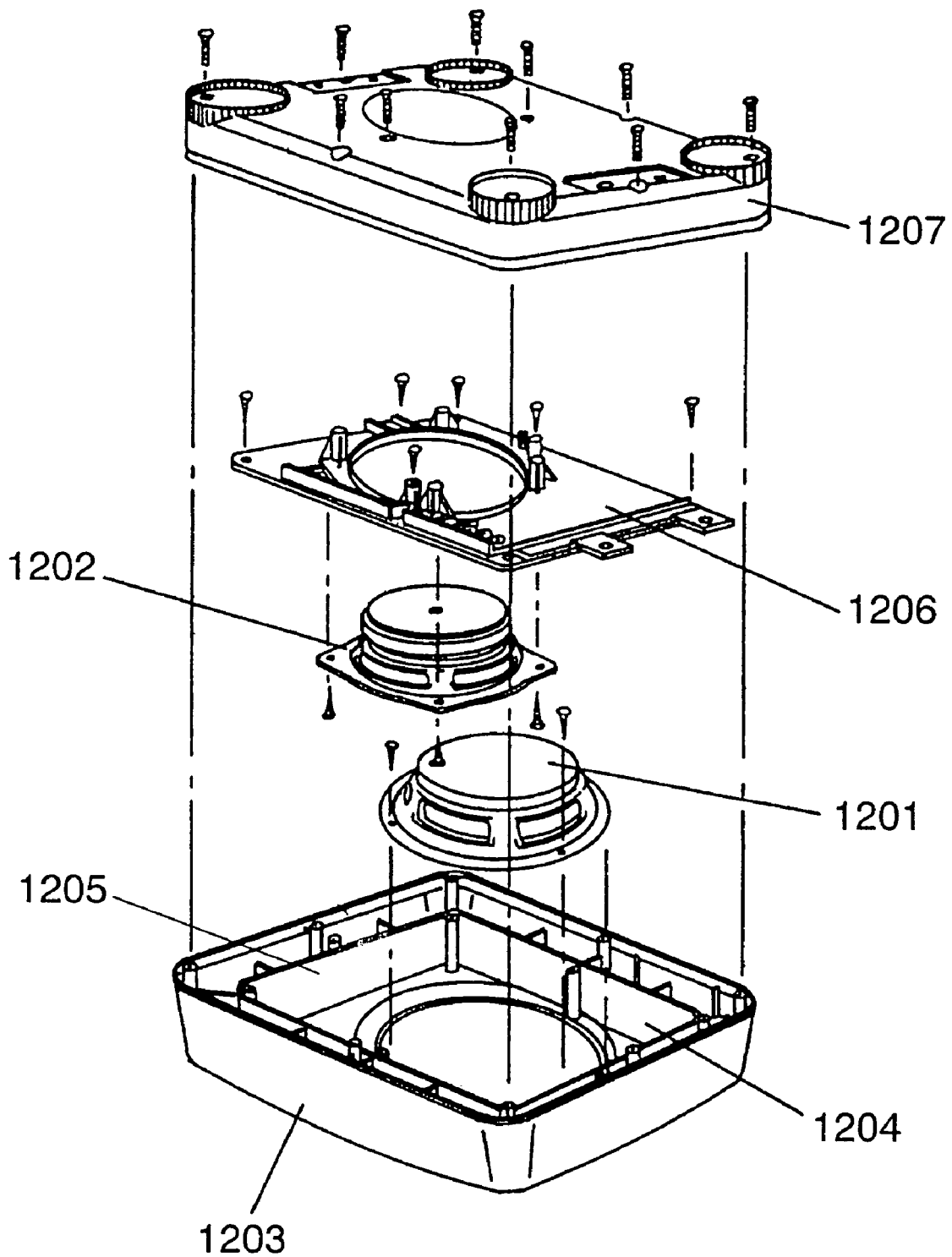
FIG. 22 shows an exploded perspective view of a conventional passive radiator type Kelton system speaker apparatus.
Figure 23:
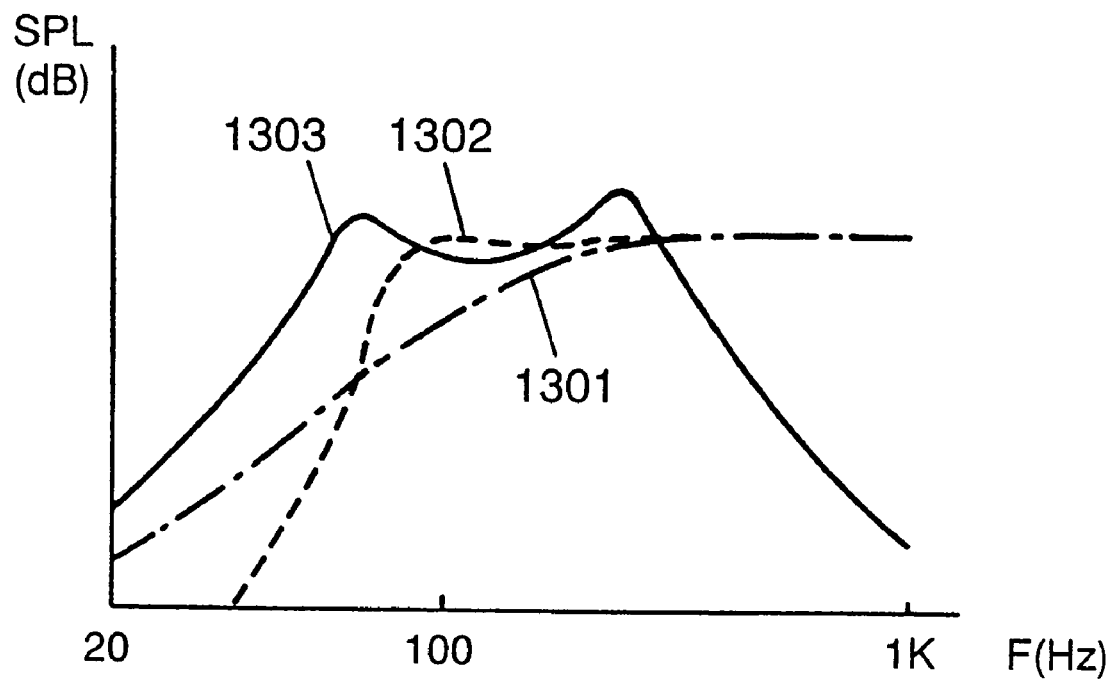
FIG. 23 shows a comparative chart showing the low range sound reproduction characteristics in a conventional passive radiator type Kelton system speaker apparatus.

FIG. 21 compares the saturation temperature. Saturation temperature curve 1002 represents the speaker unit 2102 in the second exemplary embodiment at the plate portion 2108, while saturation temperature curve 1001 represents the speaker unit 1202 of the conventional passive radiator type Kelton system speaker apparatus at the plate portion. The comparison shows that the temperature of the plate portion is maintained lower in a speaker apparatus of the second exemplary embodiment.

In the conventional passive radiator type Kelton system speaker apparatus, where a speaker unit is completely housed within the speaker apparatus, the heat dissipation characteristic is poor and the withstanding capability against high inputs is low. Whereas in a speaker apparatus of the present embodiment, the plate portion of a speaker unit is exposed to the outside; hence, the heat dissipation characteristic is significantly improved. Thus, the withstanding capability against high inputs is improved.

Figure 14:
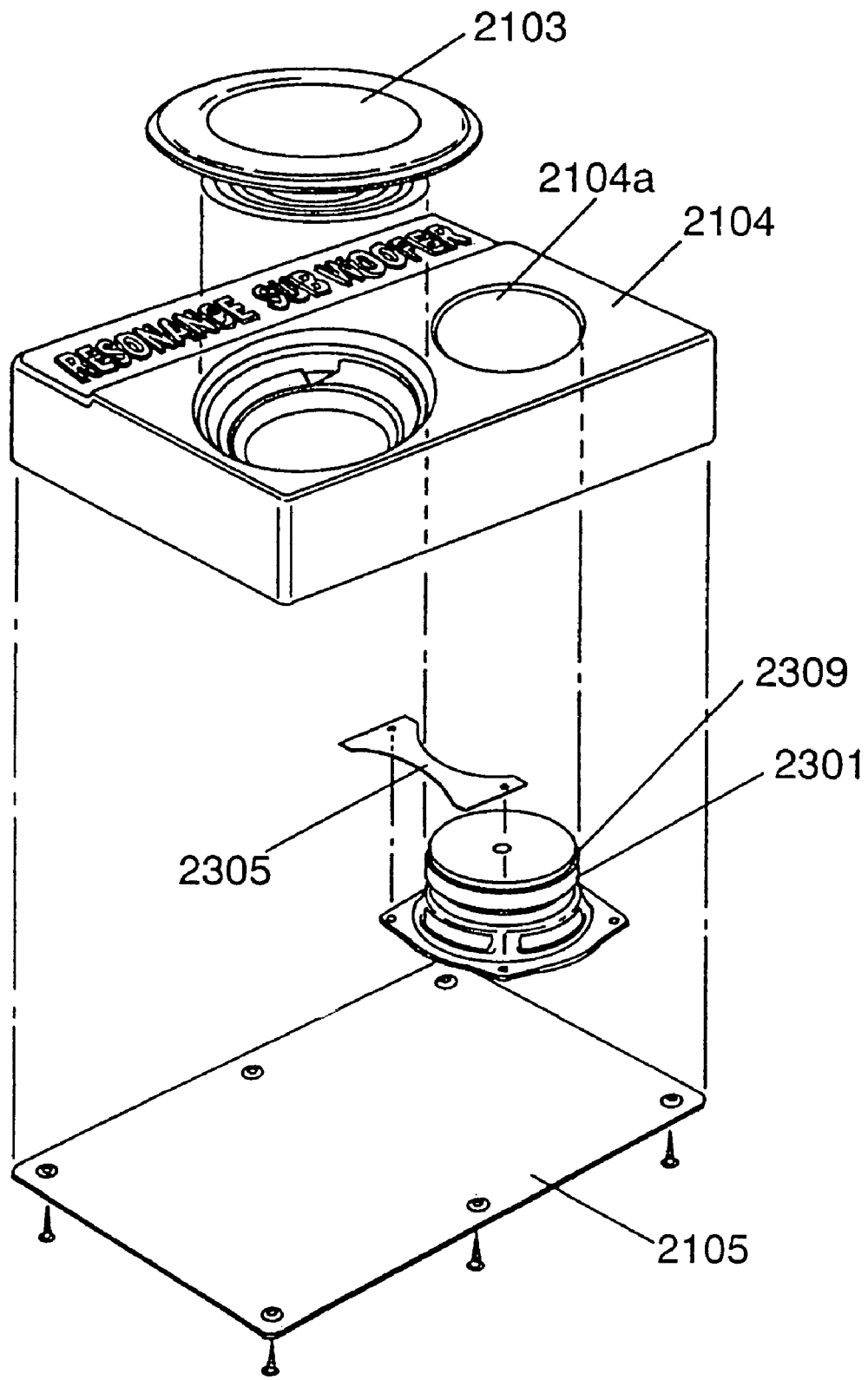
FIG. 14 shows an exploded perspective view showing another example of a speaker apparatus in the second exemplary embodiment.

FIG. 14 is an exploded perspective view of a second example of a speaker apparatus in the present embodiment. The difference with the first example is that a speaker unit 2301 used in this example has a small frame margin. The speaker unit 2301 is mounted on the front baffle 2104 using a sealing panel 2305.

The closed front chamber is formed by the speaker unit 2301, the passive radiator unit 2103, the front baffle 2104, the sealing panel 2305 and a cushion attached to magnet portion 2309 of the speaker unit 2301.

Sound output generated from the back of the speaker unit 2301 is conveyed to the passive radiator unit 2103 via the air sealed within the closed front chamber. The actual sound output is generated from the passive radiator unit 2103.

As described above, even in a case where the frame margin of the speaker unit 2301 is small and it is difficult to form a closed front chamber by simply mounting the speaker unit 2301 and the passive radiator unit 2103 on the front baffle 2104, the sealing panel 2305 enables formation of a closed front chamber. As a result, the structure of a speaker apparatus can be simplified.

Figure 15:
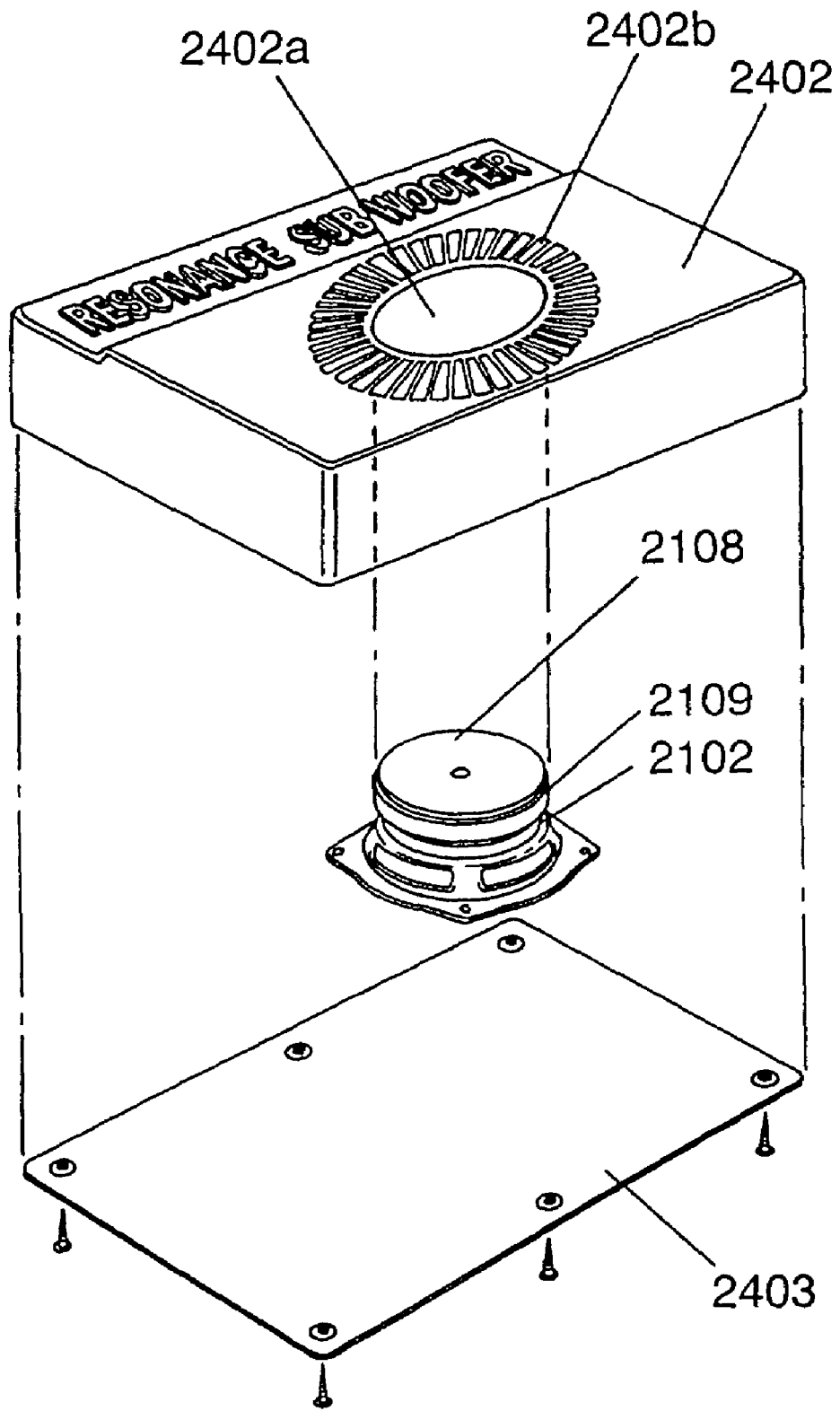
FIG. 15 shows an exploded perspective view showing still other example of a speaker apparatus in the second exemplary embodiment.
Figure 16:
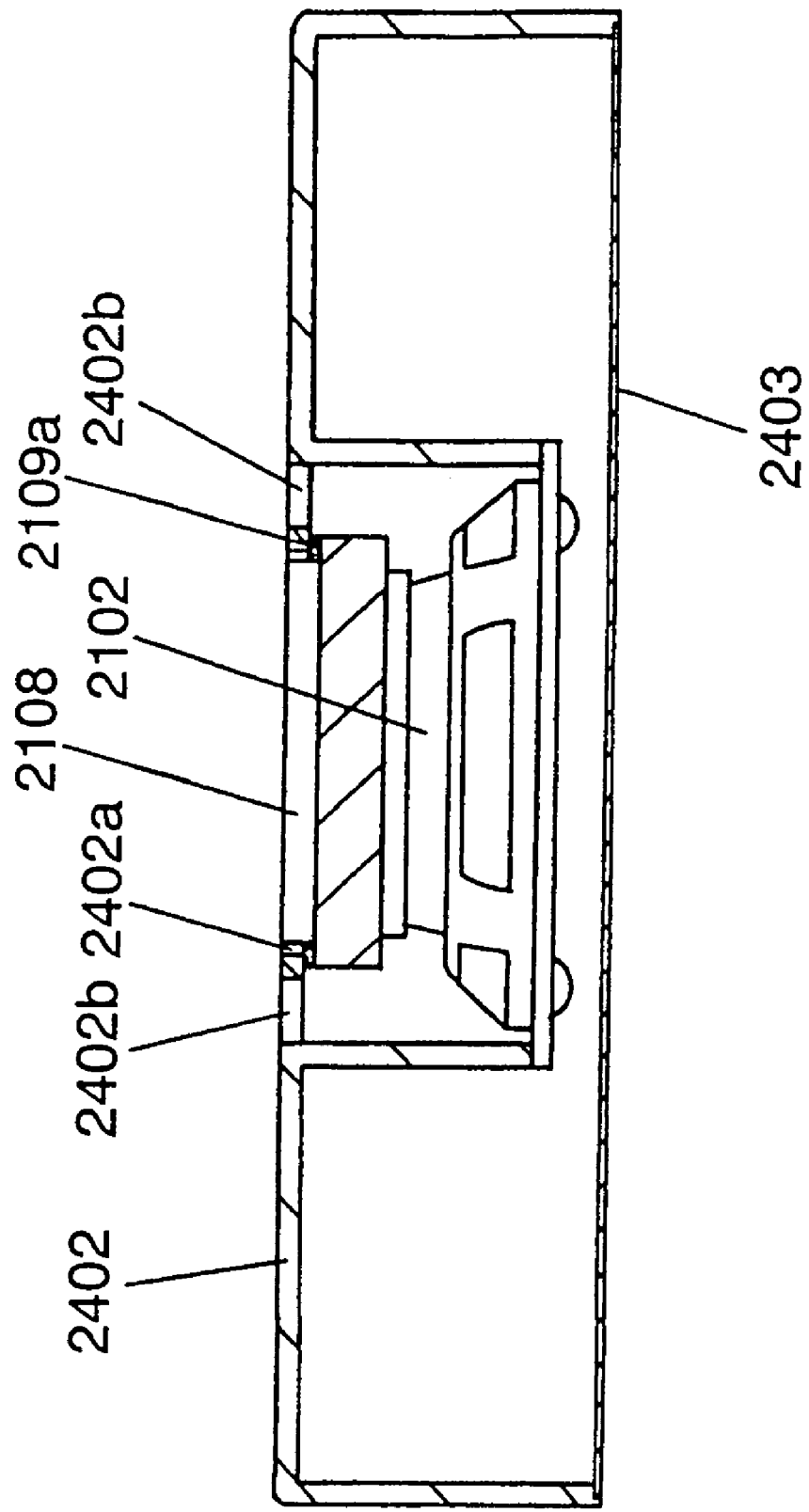
FIG. 16 shows a cross sectional view showing a speaker apparatus in the second exemplary embodiment.

FIG. 15 and FIG. 16 show an exploded perspective view and a cross sectional view, respectively, of a third example of a speaker apparatus in accordance with the present embodiment. The difference with the first example is that the present speaker apparatus uses a front baffle 2402 that is not attached with the passive radiator unit 2103. The speaker unit 2102 is mounted on the front baffle 2402 in a reverse direction.

Sound output generated from the front of the speaker unit 2102 is confined by the speaker unit 2102, the front baffle 2402 and a back plate 2403. Sound output generated from the back of the speaker unit 2102 is sealed by a cushion 2109a attached to magnet 2109 of the speaker unit 2102, and the sound output is obtained through an acoustic opening 2402b provided in the front baffle 2402. Plate portion 2108 of the speaker unit 2102 may be exposed to the outside through an opening 2402a of the front baffle 2402; this configuration contributes to make the contour of a speaker apparatus slim and to increase the heat dissipation, resulting in an improved withstanding capability against high inputs. In the present embodiment, description has been made based on a structure where the plate portion 2108 is attached to the opening 2402a of the front baffle 2402 and an acoustic opening 2402b is provided in the front baffle 2402, with the front of the speaker unit 2102 closed. However, another configuration may also be considered where actual sound is reproduced by making use of the sound output generated from the front of the speaker unit; namely, forming a speaker box by attaching the front of speaker unit to an opening of the front baffle, attaching the plate portion to an opening of the back plate, and closing it with the speaker unit, the front baffle and the back plate.

Figure 17:
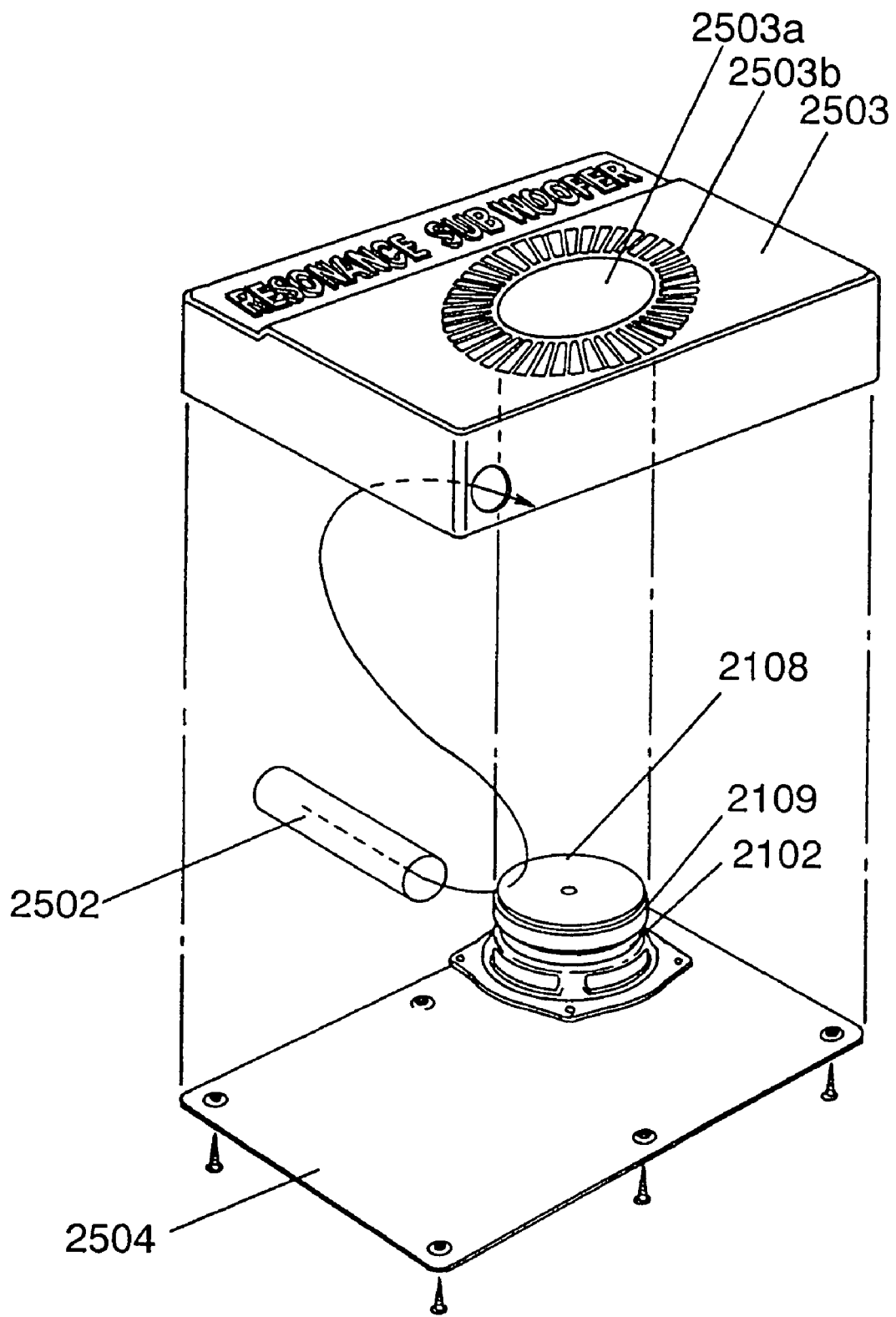
FIG. 17 shows an exploded perspective view showing another example of a speaker apparatus in the second exemplary embodiment.
Figure 18:
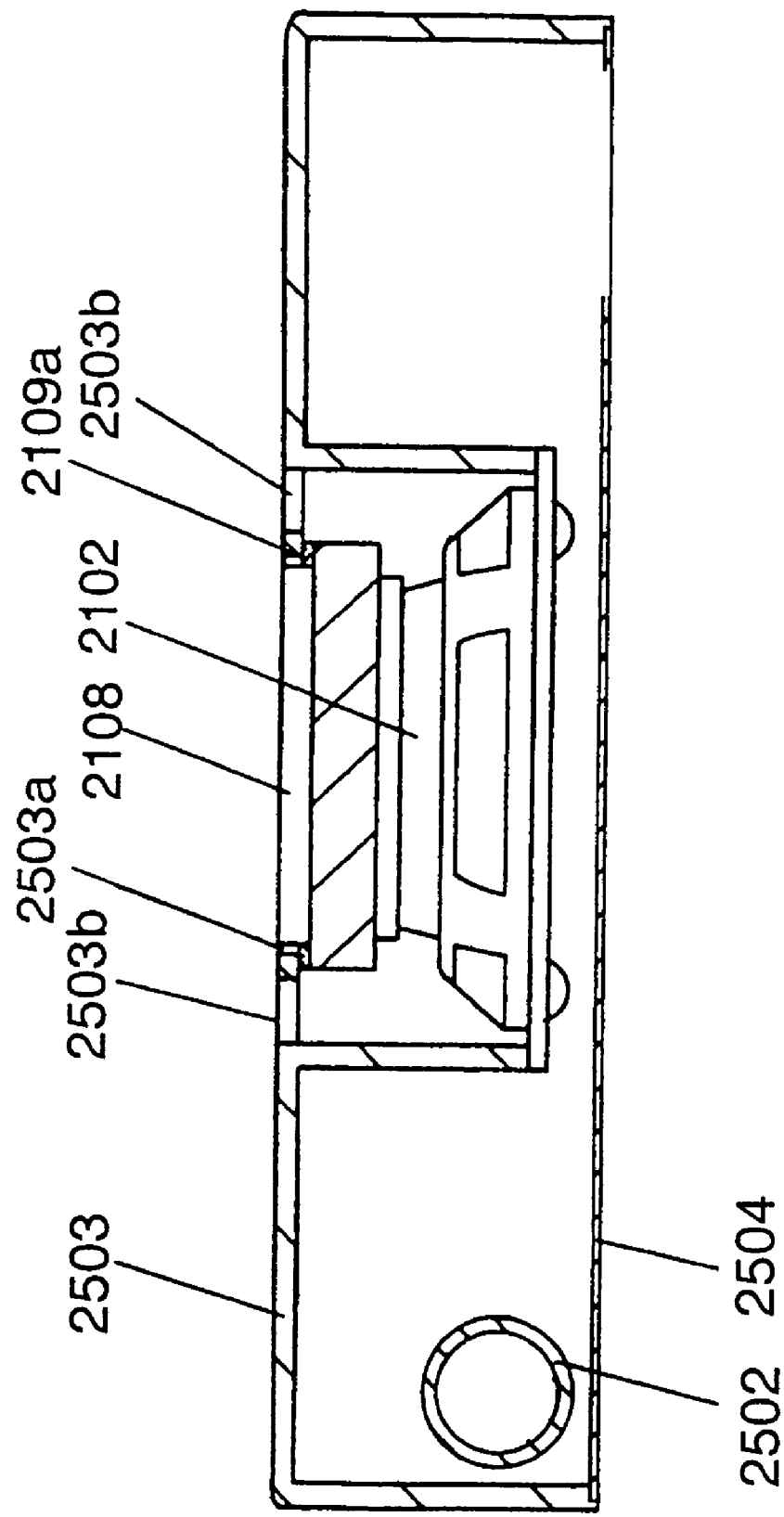
FIG. 18 shows a cross sectional view showing another speaker apparatus in the second exemplary embodiment.

FIG. 17 and FIG. 18 show an exploded perspective view and a cross sectional view, respectively, of a fourth example of a speaker apparatus in accordance with the present embodiment. The difference with the first example of the present embodiment is that the fourth example uses a front baffle 2503 that is provided with a port 2502. The speaker unit 2102 is mounted on the front baffle 2503 in a reverse direction, and sound output generated from the front of the speaker unit 2102 resonates in a space formed with the speaker unit 2102, the front baffle 2503, a back plate 2504 and the port 2502, and the resonance sound output is radiated through the port 2502. At the same time, sound output generated from the back of the speaker unit 2102 is radiated via an acoustic opening 2503b provided in the front baffle 2503. Plate portion 2108 of the speaker unit 2102 can be exposed to the outside through an opening 2503a. This configuration contributes to make the contour of a speaker apparatus slim and to enhance the heat dissipation for an improved withstanding property against high inputs. In the present embodiment, description has been made based on a structure where the plate portion 2108 is attached to the opening 2503a of the front baffle 2503, an acoustic opening 2503b is provided in the front baffle 2503, and the space formed by the speaker unit 2102, the front baffle 2503 and a back plate 2504 is provided with the a port 2502. However, another configuration may also be considered where the front of the speaker unit is attached to an opening of the front baffle and the plate portion is attached to an opening of the back plate; wherein the sound output generated from the front of the speaker unit is reproduced into actual sound, while the sound output generated from the back of the speaker unit is reproduced through the port attached to the space surrounded by the speaker unit, the front baffle and the back plate.

Figure 19:
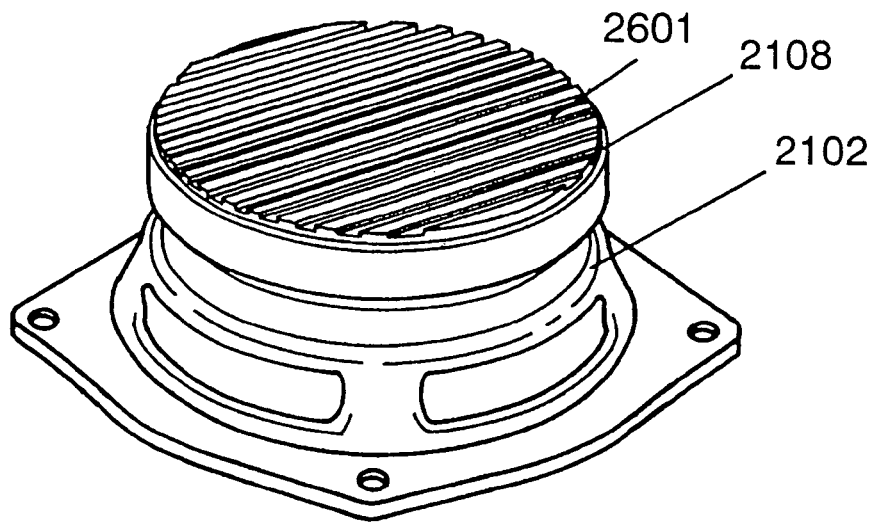
FIG. 19 shows a perspective view of a speaker unit in the second exemplary embodiment.

FIG. 19 is a perspective view of an example of a speaker unit used in a speaker apparatus in accordance with the present embodiment. The difference with the speaker unit 2102 used in the first example of the present embodiment is that the surface of plate portion 2108 is provided with an uneven surface 2601, which functions as a heat sink. When a speaker unit of the present configuration is mounted on the front baffle, the uneven surface 2601 is exposed to the outside, resulting in a further enhanced heat dissipation.

Figure 20:
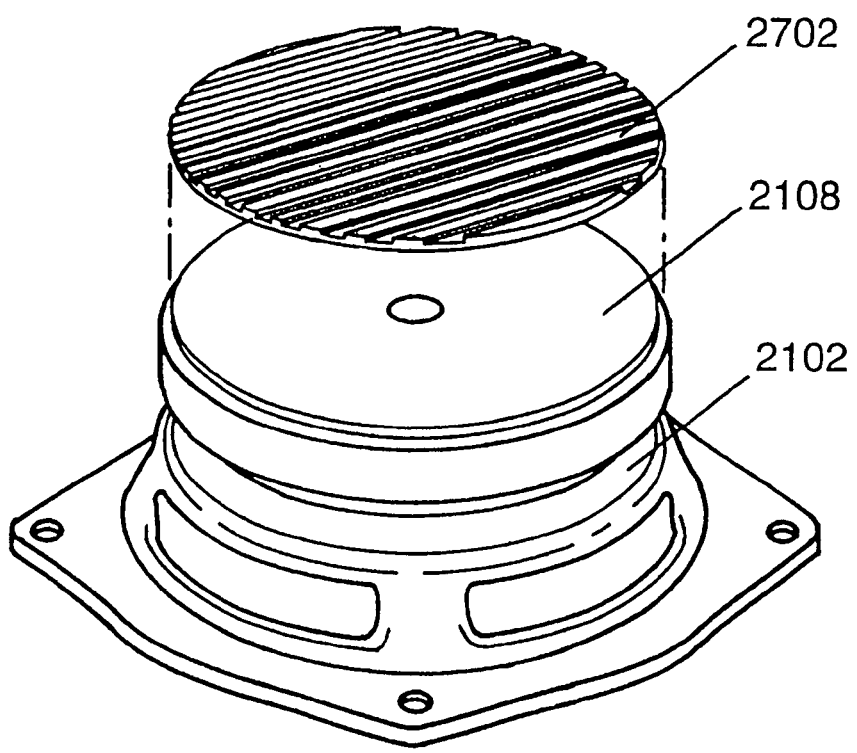
FIG. 20 shows a perspective view of a speaker unit in the second exemplary embodiment.

FIG. 20 is a perspective view of another example of a speaker unit. The present speaker unit includes a plate portion 2108 that is provided with a heat radiation fin 2702. In the same way as in the speaker unit of FIG. 19, the heat radiation fin 2702 is exposed to the outside, and the heat dissipation is further improved.

It goes without saying that the same sound feedback control with a microphone as in the first embodiment may be applied also in a speaker apparatus of the present embodiment.

A speaker apparatus in accordance with the present second embodiment can be used exclusively for low range sound reproduction.

As described in the foregoing, the sub baffle plate, which is an indispensable item in the conventional passive radiator type Kelton system speaker apparatus, is eliminated in accordance with the present invention. This leads to a simplified overall structure, and additional advantages are also provided, that the size of a speaker apparatus can be made smaller and the abnormal sound generation due to unwanted vibration can be reduced.

Furthermore, the configuration of exposing the plate portion of the speaker unit to the outside contributes to making a speaker apparatus slim and to enhancing the heat dissipation, which results in an improved withstanding capability against high inputs. Also in the closed chamber speaker apparatus and in the phase reversing speaker apparatus, the above configuration of exposing the plate portion of the speaker unit to the outside contributes to making a speaker apparatus slim and to improving the high inputs withstanding capability through an enhanced heat dissipation.

The invention claimed is:

1. A speaker apparatus comprising:
    a speaker unit;
    a passive radiator unit;
    a baffle on which said speaker unit and said passive radiator unit are directly mounted, said baffle forming a constituent part of a speaker box; and
    a back plate;
    wherein said back plate forms said speaker box in combination with said baffle;
    wherein said speaker unit, said passive radiator unit and said baffle form a first closed chamber;
    wherein said speaker unit, said baffle and said back plate form a second closed chamber;
    wherein said passive radiator unit is housed in a backside portion of said baffle;
    wherein said backside portion of said baffle is provided with a reinforcement rib disposed inside of said speaker box; and
    wherein said speaker unit is disposed so that a direction of said speaker unit is opposite to a direction of said passive radiator unit.

2. The speaker apparatus of claim 1, further comprising an auxiliary baffle disposed between said baffle and said passive radiator unit, wherein said first closed chamber is formed by said speaker unit, said passive radiator unit, said baffle and said auxiliary baffle.

3. The speaker apparatus of claim 1, wherein said passive radiator unit is mounted on a closed frame having an opening in one direction of a side of said frame.

4. The speaker apparatus recited in claim 1, wherein said passive radiator unit is provided with an edge having a thick central portion covering the surface of a diaphragm and a circumference portion integrally formed together.

5. The speaker apparatus of claim 4, wherein said edge is an up roll type edge.

6. The speaker apparatus of claim 1, wherein an area of an opening in said baffle is not less than 30% of an effective area of a diaphragm of said speaker unit, said opening connecting a space between said speaker unit and a diaphragm of said passive radiator unit.

7. The speaker apparatus of claim 1, wherein a corner edge of an opening connecting a space between said speaker unit and a diaphragm of said passive radiator unit in said first closed chamber is chamfered or rounded.

8. The speaker apparatus of claim 1, wherein a semicircular or arc-shape holder is provided integrally at a vicinity of an opening connecting a space between said speaker unit and a diaphragm of said passive radiator unit in said first closed chamber, said holder supporting a damper of said passive radiator unit.

9. The speaker apparatus of claim 1, further comprising
    a diffuser disposed in front of said baffle, and an acoustic opening disposed in a direction perpendicular to a direction of sound radiation from said passive radiator unit.

10. The speaker apparatus of claim 1, wherein said baffle is provided with heat dissipation slits and a sealing material in a region which makes contact with a bottom plate of said speaker unit.

11. The speaker apparatus of claim 1, wherein a plate portion of said speaker unit is exposed to an outside of said speaker apparatus via an opening in said baffle.

12. The speaker apparatus of claim 1, further comprising a sealing panel, wherein
    said second closed chamber is formed by said speaker unit, said baffle, said back plate and said sealing panel.

13. The speaker apparatus recited in claim 11, wherein said plate portion of said speaker unit is provided with an uneven surface.

14. The speaker apparatus recited in claim 11, wherein said plate portion of said speaker unit is provided with heat radiation fins.

15. The speaker apparatus recited in claim 2, wherein said passive radiator unit is provided with an edge having a thick central portion covering the surface of a diaphragm and a circumference portion integrally formed together.

16. The speaker apparatus recited in claim 3, wherein said passive radiator unit is provided with an edge having a thick central portion covering the surface of a diaphragm and a circumference portion integrally formed together.

17. A speaker apparatus comprising:
    a speaker unit;
    a passive radiator unit;
    a baffle on which said speaker unit and said passive radiator unit are mounted, wherein said baffle is provided with an opening for exposing a plate portion of said speaker unit to an outside of said speaker apparatus; and
    a back plate;
    wherein said back plate forms said speaker box in combination with said baffle;
    wherein said speaker unit, said passive radiator unit and said baffle form a first closed chamber;
    wherein said speaker unit, said baffle and said back plate form a second closed chamber;
    wherein said passive radiator unit is housed in a backside portion of said baffle;
    wherein said backside portion of said baffle is provided with a reinforcement rib disposed inside of said first closed chamber; and
    wherein said speaker unit is disposed so that a direction of said speaker unit is opposite to a direction of said passive radiator unit.

* * * * *